United States Patent
Zhang et al.

(10) Patent No.: US 9,483,532 B1
(45) Date of Patent: *Nov. 1, 2016

(54) TEXT PROCESSING SYSTEM AND METHODS FOR AUTOMATED TOPIC DISCOVERY, CONTENT TAGGING, CATEGORIZATION, AND SEARCH

(71) Applicants: Guangsheng Zhang, Palo Alto, CA (US); Chizhong Zhang, Sunnyvale, CA (US)

(72) Inventors: Guangsheng Zhang, Palo Alto, CA (US); Chizhong Zhang, Sunnyvale, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/720,789

(22) Filed: May 24, 2015

Related U.S. Application Data

(63) Continuation of application No. 13/707,940, filed on Dec. 7, 2012, now Pat. No. 9,047,283, which is a continuation-in-part of application No. 12/972,462, filed on Dec. 18, 2010, now Pat. No. 8,407,217.

(60) Provisional application No. 61/568,657, filed on Dec. 9, 2011, provisional application No. 61/682,205, filed on Aug. 11, 2012, provisional application No. 61/299,823, filed on Jan. 29, 2010, provisional application No. 61/306,523, filed on Feb. 21, 2010, provisional application No. 61/306,524, filed on Feb. 21, 2010.

(51) Int. Cl.
*G06F 17/30* (2006.01)
*G06F 17/21* (2006.01)

(52) U.S. Cl.
CPC ......... *G06F 17/3053* (2013.01); *G06F 17/21* (2013.01); *G06F 17/30864* (2013.01)

(58) Field of Classification Search
CPC .......... G06F 17/3053; G06F 17/2785; G06F 17/274; G06F 17/2765; G06F 17/28; G06F 17/241; G06F 17/30734; G06F 17/2836; G06F 17/30864; G06F 17/30483; G06F 17/30722; G06F 17/30873; G06F 17/30882; G06F 17/21; G10L 15/26
See application file for complete search history.

(56) References Cited

U.S. PATENT DOCUMENTS

| | | |
|---|---|---|
| 5,930,788 A | 7/1999 | Wical |
| 6,101,515 A | 8/2000 | Wical |

(Continued)

OTHER PUBLICATIONS

Rattasit Sukhahuta and Dan Smith—"Information Extraction for Thai Documents"—Published in: Proceeding IRAL '00 Proceedings of the fifth international workshop on on Information retrieval with Asian languages—pp. 103-110.*

(Continued)

*Primary Examiner* — Anh Ly

(57) ABSTRACT

A computer system and methods are disclosed for automatically discovering topics and building a hierarchical topic structure, and for tagging and categorizing contents in a document or other natural language contents. The disclosed methods include steps for obtaining terms that best represent the topics in a text content, and building a hierarchical representation of topics of different levels or topic-comment relationships, and folder-subfolder structures. The methods further include obtaining, identifying, and selecting terms representing different degrees of informational importance based on the grammatical roles, parts of speech, and semantic attributes associated with the terms, using the terms to represent topics in the document, to automatically tag the document, to rank search results, and to build a category structure based on the selected terms.

20 Claims, 29 Drawing Sheets

(56) References Cited

U.S. PATENT DOCUMENTS

| | | | |
|---|---|---|---|
| 6,393,389 B1* | 5/2002 | Chanod | G06F 17/271 704/4 |
| 6,487,545 B1 | 11/2002 | Wical | |
| 7,827,125 B1* | 11/2010 | Rennison | G06F 17/3066 706/14 |
| 8,311,874 B2 | 11/2012 | Gupta | |
| 8,429,179 B1* | 4/2013 | Mirhaji | G06F 17/30312 707/756 |
| 2004/0044952 A1* | 3/2004 | Jiang | G06F 17/30616 707/E17.084 |
| 2004/0153451 A1 | 8/2004 | Phillips | |
| 2005/0005266 A1* | 1/2005 | Datig | G06F 17/279 717/136 |
| 2005/0216443 A1* | 9/2005 | Morton | G06F 17/3002 707/E17.083 |
| 2006/0069589 A1* | 3/2006 | Nigam | G06Q 30/02 706/55 |
| 2006/0253438 A1* | 11/2006 | Ren | G06F 17/30616 707/E17.084 |
| 2007/0050191 A1* | 3/2007 | Weider | G06F 17/30864 704/275 |
| 2007/0061717 A1* | 3/2007 | Cragun | G06F 17/30716 707/E17.093 |
| 2007/0067157 A1 | 3/2007 | Kaku et al. | |
| 2007/0073678 A1* | 3/2007 | Scott | G06F 17/30737 707/E17.1 |
| 2007/0073745 A1* | 3/2007 | Scott | G06F 17/30737 707/E17.1 |
| 2007/0255553 A1* | 11/2007 | Nomoto | G06F 17/2785 707/E17.084 |
| 2007/0294614 A1* | 12/2007 | Jacquin | G06F 17/2247 707/E17.093 |
| 2008/0275694 A1* | 11/2008 | Varone | G06F 17/2785 704/9 |
| 2009/0089277 A1 | 4/2009 | Cheslow et al. | |
| 2009/0112892 A1* | 4/2009 | Cardie | G06F 17/30719 707/E17.058 |
| 2009/0119095 A1* | 5/2009 | Beggelman | G06F 17/2785 704/9 |
| 2009/0197619 A1 | 8/2009 | Colligan | |
| 2009/0271179 A1 | 10/2009 | Marchisio et al. | |
| 2009/0300003 A1* | 12/2009 | Suzuki | G10L 15/1822 704/235 |
| 2010/0195504 A1 | 8/2010 | Nandagopal et al. | |
| 2010/0195909 A1* | 8/2010 | Wasson | G06F 17/241 382/176 |
| 2011/0035345 A1 | 2/2011 | Duan et al. | |
| 2012/0078919 A1* | 3/2012 | Mineno | G06F 17/278 707/748 |

OTHER PUBLICATIONS

Ekaterini Pastra—"Basic Semantic Element Extraction: The Rule Writing Experience"—The University of Manchester Institute of Science and Technology for the degree of MSc in Machine Translation—Manchester, Sep. 2000—pp. 1-127.*

* cited by examiner

| Term | External Term Prominence | | | |
|---|---|---|---|---|
| | With parser | Without parser | Paragraph | Document |
| computer | 0.002 | 0.0003 | 0.05 | 0.0004 |
| CUP | 0.001 | 0.0004 | 0.002 | 0.0002 |
| memory | 0.004 | 0.0006 | 0.054 | 0.0003 |
| Hard disk | 0.006 | 0.0003 | 0.056 | 0.0004 |
| software | 0.002 | 0.0003 | 0.058 | 0.0006 |
| ...... | | | | |

Figure 4A: external data table

| Term | External Term Prominence for different grammatical roles in terms of token types | | | | | | | | | |
|---|---|---|---|---|---|---|---|---|---|---|
| | Type 1 | Type 2 | Type 3 | Type 4 | Type 5 | Type 6 | Type 7 | Type 8 | Other 1 | Other 2 |
| computer | 0.002 | 0.0003 | 0.05 | 0.0004 | 0.03 | 0.09 | 0.001 | 0.03 | 0.21 | 0.05 |
| CUP | 0.001 | 0.0004 | 0.002 | 0.0002 | 0.03 | 0.099 | 0.001 | 0.03 | 0.14 | 0.009 |
| memory | 0.004 | 0.0006 | 0.054 | 0.0003 | 0.03 | 0.093 | 0.001 | 0.03 | 0.05 | 0.0045 |
| Hard disk | 0.006 | 0.0003 | 0.056 | 0.0004 | 0.03 | 0.095 | 0.001 | 0.03 | 0.07 | 0.222 |
| software | 0.002 | 0.0003 | 0.058 | 0.0006 | 0.03 | 0.096 | 0.001 | 0.03 | 0.08 | 0.021 |
| ...... | | | | | | | | | | |

Figure 4B: external data table with values for different token types

| From | Subject | Keywords | Date | Size |
|---|---|---|---|---|
| John | Re: Weekend Exercise | Hiking, Next Sunday, | 3/1/2009 | 8 KB |
| Mary | Weekend Exercise | Lakeside, park | 2/27/2009 | 2 KB |
| Mary | bascketball | Lakers | 2/20/2009 | 6 KB |
| Michael | Re: Class schedule | Afternoon labs | 2/3/2009 | 5 KB |
| Susan | Class schedule | physics, English | 2/3/2009 | 4 KB |
| Jason | Re: Healthy food info | Healthy food, club activity | 1/21/2009 | 4 KB |
| Jim | Re: Healthy food info | Healthy food, club activity | 1/21/2009 | 3 KB |
| Jessica | Healthy food info | Healthy food, new studies | 1/20/2009 | 3 KB |

Figure 7

| Unique Terms in a Document | Corresponding Term Frequency |
|---|---|
|  |  |
| computer | 15 |
| CPU | 20 |
| memory | 25 |
| hard disk | 8 |
| operating system | 16 |
| software | 6 |
| …… | …… |

Figure 8A

| Unique Terms in the Inverted Index of the Document Collection | Postings for Each Term in the Inverted Index with Term Frequency |
|---|---|
|  |  |
| computer | {doc-1:15, doc-3:12, doc-20:11, … doc-n:2} |
| CPU | {doc-52:38, doc-3:35, doc-88:11, … doc-m:1} |
| memory | {doc-12:55, doc-25:40, doc-2:25, … doc-k:1} |
| hard disk | {doc-8:19, doc-5:18, doc-22:16, … doc-j:2} |
| operating system | {doc-23:18, doc-25:17, doc-62:16, … } |
| software | {doc-68:7, doc-56:6, doc-12:3, … } |
| …… | …… |

Figure 8B

| Unique Terms in a Document | Corresponding Term Information Focus Score |
|---|---|
|  |  |
| computer | 1.0 |
| CPU | 0.6 |
| memory | 0.3 |
| hard disk | 0.5 |
| operating system | 0.4 |
| software | 0.2 |
| ...... | ...... |

Figure 9A

| Unique Terms in the Inverted Index of the Document Collection | Postings for Each Term in the Inverted Index with Term Information Focus Score |
|---|---|
|  |  |
| computer | {doc-98:1.0, doc-6:0.95, doc-12:0.7, ... doc-n:0.16} |
| CPU | {doc-11:0.8, doc-78:0.65, doc-4:0.52, ... doc-m:0.01} |
| memory | {doc-53:0.77, doc-68:0.35, doc-1:0.35, ... doc-k:0.2} |
| hard disk | {doc-5:0.65, doc-7:0.35, doc-22:0.32, ... doc-j:0.002} |
| operating system | {doc-68:0.46, doc-3:0.35, doc-9:0.21, ... } |
| software | {doc-32:0.71, doc-32:0.7, doc-2:0.3, ... } |
| ...... | ...... |

Figure 9B

United States Patent

System and Methods for Information Management

<u>Summary/keywords in sections</u>:                1310
<u>Claims</u>: information system, document content
<u>Background</u>: search engine, webpage, ranking
<u>Summary of Invention</u> : information retrieval, document score, calculation, ...
<u>Detailed Description</u>: ........

Abstract

The present disclosure ...

| From | Subject | Date | Size |
|---|---|---|---|
| John | Re: Healthy food info | 3/1/2009 | 8 KB |
| Mary | Weekend Exercise | 2/27/2009 | 2 KB |
| Mary | Re: Healthy food info | 2/20/2009 | 6 KB |
| Michael | Re: Healthy food info | 2/3/2009 | 5 KB |
| Susan | Re: Healthy food info | 2/3/2009 | 4 KB |
| Jason | Re: Healthy food info | 1/21/2009 | 4 KB |
| Jim | Re: Healthy food info | 1/21/2009 | 3 KB |
| Jessica | Healthy food info | 1/20/2009 | 3 KB |

Figure 15A

| From | Subject | New Topics 1510 | Date | Size |
|---|---|---|---|---|
| John | Re: Healthy food info | Hiking, Next Sunday, | 3/1/2009 | 8 KB |
| Mary | Weekend Exercise | Lakeside, park, sunny | 2/27/2009 | 2 KB |
| Mary | Re: Healthy food info | Water filter, price, mall | 2/20/2009 | 6 KB |
| Michael | Re: Healthy food info | Apple skin, pesticide | 2/3/2009 | 5 KB |
| Susan | Re: Healthy food info | Plastic wrapping, pollutants | 2/3/2009 | 4 KB |
| Jason | Re: Healthy food info | Healthy food, club activity | 1/21/2009 | 4 KB |
| Jim | Re: Healthy food info | Healthy food, club activity | 1/21/2009 | 3 KB |
| Jessica | Healthy food info | Healthy food, new studies | 1/20/2009 | 3 KB |

Figure 15B

Subject: Monday's meeting

From: John    Date: 11/12/12

Message: How about Tuesday at 3pm in the conference room?    1810

Previous messages:    1820

From: Mary    Date: 11/11/12    1830

Message: I'm not sure I can make it then. Can we reschedule?

From: Bob    Date: 11/11/12

Message: Yes, I think that will work for me. See you then.

From: John    Date: 11/10/12

Message: Hey, are we still meeting on Monday at 2pm?

Figure 18

| Name | Content Focus | Key Term | Key Sentence | Date |
|---|---|---|---|---|
| batt_2.txt | battery; electron | chemical reac... | The speed of electron pro... | 3/16 |
| cam_8.txt | panasonic lumix d... | lcd; casio exili... | A remote control makes it... | 3/17 |
| bb_2.txt | basketball; ball | basket; dribbli... | Basketball's popularity re... | 3/18 |
| ap_1.txt | accounts payable;... | cable company | Investopedia explains Acc... | 3/21 |
| payr_4.txt | paychex; payroll | close; browser... | Paychex Offers Certified P... | 3/22 |
| sf_5.txt | largest chinatown... | san francisco ... | San Francisco Chinatown i... | 3/22 |
| phys_8.txt | physicscentral; fa... | miss allgame... | APS | Journals | PhysicsCen... | 4/5/ |
| chem_17.txt | chemistry; depart... | purdue univer... | The faculty and staff of th... | 4/5/ |
| bio_19.txt | biology; organism | physiology; g... | Molecular biology, Cell bi... | 4/5/ |
| m Type: Text Document | | xplore how ... | Articles explaining the div... | 4/5/ |
| fo Keyword List: * | | onovan mon... | NFL and the NFL shield de... | 4/5/ |
| ba * biology | | ankee; vendit... | Fantasy Baseball Weekly P... | 4/5/ |
| 6.t * organism * physiology | | rganic food | Family farms that are certi... | 6/18 |
| 7.t * genetics | | ip code | This peppery green is pac... | 6/18 |
| 8.t * molecular biology | | rocedureshe... | If a food bears a USDA Or... | 6/18 |
| 9.t * evolutionary biology * ecology | | 010 organic ... | This site, Organic Mall.co... | 6/18 |

TEXT PROCESSING SYSTEM AND METHODS FOR AUTOMATED TOPIC DISCOVERY, CONTENT TAGGING, CATEGORIZATION, AND SEARCH

CROSS REFERENCES TO RELATED APPLICATIONS

The present application is a Continuation Application of U.S. patent application Ser. No. 13/707,940 entitled "Automated Topic Discovery in Documents and Content Categorization" filed on Dec. 7, 2012. U.S. patent application Ser. No. 13/707,940, now U.S. Pat. No. 9,047,283 B1, issued on Jun. 2, 2015, is a continuation-in-part application of U.S. patent application Ser. No. 12/972,462, now U.S. Pat. No. 8,407,217 B1, issued on Mar. 26, 2013, entitled "Automated Topic Discovery in Documents" filed on Dec. 18, 2010. U.S. patent application Ser. No. 12/972,462 further claims priority to U.S. Provisional Patent Application 61/299,823, titled "System and Methods for Automated Document Topic Discovery, Browsable Search, Relevance Ranking, Summary Generation and Display", filed on Jan. 29, 2010, U.S. Provisional Patent Application 61/306,523, titled "System and Methods for Efficient Email Indexing, Search, and Storage", filed on Feb. 21, 2010, and US Provisional Patent Application 61/306,524, titled "System, Methods, and User Interface for Extracting and Displaying Symbolic Elements from User-Created Contents", filed on Feb. 21, 2010. U.S. patent application Ser. No. 13/707,940 also claims priority to U.S. Provisional Patent Application 61/682,205 titled "System and Methods for Determining Term Importance and Relevance between Text Contents Using Conceptual Association Datasets" filed on Aug. 11, 2012, and U.S. Provisional Patent Application 61/568,657 entitled "System, Methods, and User Interface for Organizing Document Contents into a Hierarchical Structure and Selective Highlighting of Terms" filed on Dec. 9, 2011. The disclosures of the above applications are incorporated herein by reference.

BACKGROUND OF THE INVENTION

The present application relates to information management technologies, and more particularly, to technologies for automated topic discovery in documents, term importance determination, automatic content categorization, content highlighting and summarization, information presentation, and document search and ranking.

Information overload is a common problem in the information age. Accurate and efficient information access, including collection, storage, organization, search and retrieval is the key to success in this information age.

Much of the information is contained in natural language contents, such as text documents. One particular challenge in information management is to efficiently handle what is called the "unstructured data". Usually, a document collection in its natural state is unorganized, or in a so-called unstructured state. Examples of such documents can include Web pages scattered over the Internet, documents in a company or other organizations, and documents on personal computers.

Various theoretical and practical attempts have been made to organize and determine the amount and relevancy of the information in natural language contents. Conventional techniques include search engines and document classification systems. In document search, information in the unstructured document data is accessed by sending queries to a search engine or index server that returns the documents believed to be relevant to the query. One problem with using queries to access unknown data is that the users often do not know what information is contained in the documents. Thus users often cannot come up with the right key words to effectively retrieve the most relevant information. Another problem is that conventional search engines cannot accurately determine the amount of information or the focus of information contained in a document, such that the results produced by conventional search engines usually contain many irrelevant data. Often, time is wasted before the needed information is found.

There is still a need for technologies that can provide more efficient ways for finding the needed information among a large number of documents, and provide alternative ways to conventional search in finding, organizing, and presenting such information.

SUMMARY OF THE INVENTION

The presently disclosed systems and methods are intended to overcome the above described drawbacks and meet the challenges in the conventional information management techniques.

The present disclosure provides an efficient, accurate, and scalable solution to organizing and transforming unstructured data into forms that can help the user to easily and quickly find the needed documents.

The present disclosure provides novel methods for the automatic identification or discovery of the potential topics in a document, or a portion of a document, or a collection of multiple documents. Moreover, the terms in such document objects can be ranked according to their respective degrees of importance in terms of representing the information focus of the document, and can be used for automatic document tagging or summarization, more accurate document search relevance ranking, and more effective information presentation.

The present disclosure further provides methods for the application of such information focus data as solutions to organizing the unstructured data, in terms of facilitating more accurate and faster search and retrieval of needed documents.

The present disclosure further provides methods for organizing unstructured or dispersed text data into a hierarchical structure, and presenting the major topics and minor topics, or information about the topics contained in a text content in an organized and structured format. The organized information presentation format is further incorporated into search results. Furthermore, user interface objects and methods are provided to selectively display or highlight the information focus of the text contents.

In a general aspect, the present invention relates to a computer-assisted method for discovering topics in a text content. The method includes tokenizing the text content into tokens of terms, and calculating a term importance score based on the grammatical role, or parts of speech, or semantic roles or semantic attribute types or values, and token counts.

In another aspect, the present invention relates to a computer system for organizing and presenting information in a hierarchical structure based on the major topics and minor topics discovered from the text content.

Although the invention has been particularly shown and described with reference to multiple embodiments, it will be understood by persons skilled in the relevant art that various changes in form and details can be made therein without departing from the spirit and scope of the invention.

BRIEF DESCRIPTION OF THE DRAWINGS

The following drawings, which are incorporated in and form a part of the specification, illustrate embodiments of the present invention and, together with the description, serve to explain the principles of the invention.

FIGS. 4A and 4B are exemplar data structures comprising terms and their associated prominence values for different token types as external data.

FIG. 7 is an exemplar user interface displaying topic terms to describe pertinent topic information in individual emails.

FIGS. 8A and 8B show conventional frequency-based document indexing and search result ranking.

FIGS. 9A and 9B show exemplified approaches for information-focus-based document indexing and search result ranking in accordance with the present invention.

FIG. 13 is an exemplar product of displaying combined summery/keyword lines for each section or segment of a multi-section document in accordance with the present invention.

FIGS. 15A and 15B show emails listed with the most-recent topics discovered and displayed in accordance with the present invention.

FIG. 18 is a diagram illustrating the various sections of an email thread

FIG. 21 is a user interface for displaying extracted topic terms and summary keywords for files.

DETAILED DESCRIPTION OF THE INVENTION

The present disclosure is based on a theoretical framework developed by the present inventor about aspects of human knowledge and linguistic information.

Human knowledge, or aspects of human knowledge, can be represented in various ways. While internal knowledge representations are functions of human brains, external or artificial representations such as Frame Representation and Semantic Networks are simulation models for certain aspects of such internal knowledge.

The present invention is based on a novel model developed by the present inventor for knowledge and linguistic information representation. The model, called Object Properties Association Model (OPAM), states that part of human knowledge is based on concepts about objects and their associated properties, or based on relationships between different objects. Certain objects are perceived as the properties of other objects. Certain objects are associated with other objects in ways that uniquely define the concepts of such other objects. Simply put, OPAM contends that an object can be uniquely defined by all its associated properties each of which carries a varying amount of information about the object.

Figure 1:
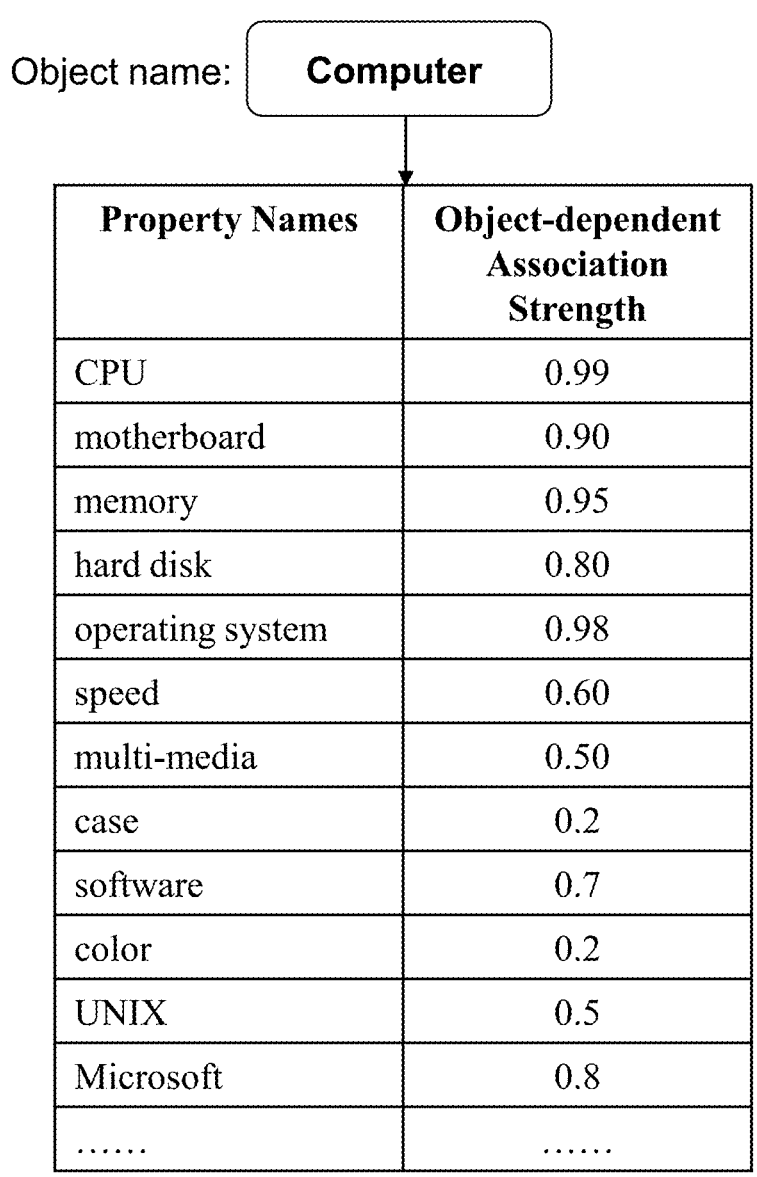
FIG. 1 illustrates an example of the Object-Properties Association definition of the object "computer" in accordance with the present invention.

As an example, an object named "computer" is defined by the Merriam-Webster online dictionary as "one that computes; specifically: a programmable usually electronic device that can store, retrieve, and process data". However, the OPAM model of the present disclosure has a different approach to represent our knowledge about the object of "computer". Referring to FIG. 1, in the OPAM model, the object named "computer" is characterized by a plurality of associated properties such as "CPU", "motherboard", "memory", "hard disk", "operating system", "speed", "case", "software", etc., that are associated with the object "computer". The prominence of the association between "computer" and each of the properties is characterized by a numerical value herein called association strength. Hypothetical values for the association strengths for "CPU", "motherboard", "memory", "hard disk", "operating system", can for example respectively be 0.99, 0.90, 0.95, 0.80, and 0.98. A higher association strength value can represent a stronger association between the property and the object. The object "computer" can be uniquely defined by the associated properties and their respective association-strength values. Moreover, the association-strength value for a property is specific to the object, and usually varies for different objects. For example, the property "color" may have an association-strength value of 0.8 if the object is "flower", but an association-strength value of 0.2 if the object is "computer".

Conventional knowledge representation models such as the Frame Representation and Semantic Networks focus on the types of relationships between different objects and their derived relationships, such as a tree-like structure of parent-children relationships among different objects. OPAM model of the present invention, in contrast, focuses on what properties are associated with a particular object and their association strength or defining power to the object. OPAM is not focused on the exact types of relationships between the properties and the object.

In OPAM, the object can be a physical object, or an abstract object such as a concept, and can be represented by a symbolic name in a language such as a word, a list of words or a phrase, a character string, a query, a sub-component of a query, a topic, or the name of a document category.

It should be noted that as the present disclosure involves natural languages, and makes references to certain grammatical terms such as a "sentence", and the "subject" and "predicate" of a sentence, the term "object" used in the present disclosure in the context of the Object Properties Association Model (OPAM) is different from the grammatical term of "object" that refers to the object of a transitive verb, such as a noun or a pronoun, which may be in the accusative case in certain languages, as is used when describing new methods using grammatical analysis with parts of speech. In the context of the Object Properties Association Model (OPAM), the sense of "object" used is a thing or a concept with a name.

Properties of an object can have varying degrees of prominence or association strengths to the object. While the properties are "defining features" of an object, the association strengths in OPAM specify that some properties are more "defining" than others. For example, the object of "computer" is associated with various properties such as having a CPU, memory, a case, a hard disk, as shown in FIG. 1. The property "CPU" having an association-strength of 0.99 is a more defining feature of the object "computer" than the property "case" that has an association-strength value of 0.2.

The OPAM also states that such object-properties relationships are contained in our everyday language. Corresponding to the grammatical structure, there is an information structure in the language we use. Take a simple declarative sentence for example. A simple declarative sentence consists of two parts, the subject and the predicate. In linguistics, a common understanding is that the subject is what the sentence is about, and the predicate tells something about the subject. In the following simple sentences:

1A: "John is a student."
1B" "John is intelligent."

"John" is the subject of the sentences, while "is a student" and "is intelligent" are respectively the predicates of sentences 1A and 1B.

In the OPAM model, the predicate is interpreted as providing a piece of measurable information about the subject of the sentence. The OPAM model also states that human languages convey information in the basic form of stating that an object has certain properties, or an object is associated with certain other objects as being its properties. The general information structure for a simple declarative sentence is "Object O has or is associated with Property P", or O+P, corresponding to the grammatical structure of "Subject+Predicate", where the Subject is the name of an object, and the Predicate is a declaration that the object has (or is associated with) one or more properties. In the present disclosure, the use of "simple sentence" and "simple declarative sentence" is interchangeable.

The simple sentence 1A is a statement about two objects of "John" and "student". In a conventional understanding, the speaker is telling something about John (that he is a student). In a mathematical or logical interpretation, the object "John" is declared to be a member of the object class of students. In the presently disclosed OPAM, the object "John" is said to have or to be associated with a property of "being a student". The speaker is providing a piece of information about the object of "John". The simple sentence 1B associates another property with the object of "John" (that he is intelligent), thus providing another piece of information about the object of "John".

The same information structure in the simple sentences can also hold in complex sentences, as well as the grammatically distinguished compound sentences. A complex sentence is a sentence that contains other (embedded) sentences or clauses as its components. For example, in the complex sentence "I know that you are intelligent", the predicate "know that you are intelligent" contains another sentence of "you are intelligent", which has its own subject ("you" in this case) and predicate ("are intelligent"). Complex sentences, and simple sentences contained in them, can be recursively reduced to the atomic Subject+Predicate structure, corresponding to the basic information structure of Object+Property.

In conventional grammar, a compound sentence is a sentence that contains two or more independent clauses, or non-embedded clauses, such as "John is a student, and Mary is a teacher." in which the two clauses do not contain each other. For convenience, in the present disclosure, the term "complex sentence" refers to both the complex sentence and the compound sentence.

The subject or the predicate of a sentence can be in the form of a single word, a string of words or a phrase, or an embedded clause.

In linguistics, a phrase that consists of multiple words is often called a complex phrase, with an internal structure of "Modifiers+Head". For example, in the phrase "digital cameras", "digital" is the modifier, while "cameras" is the head. The order of the head vs. the modifiers in the phrase depends on the specific languages. In English, the head of a noun phrase may either be before or after the modifier. For example, in the phrase "the observed facts" and "the facts observed", the head noun of "facts" can be before or after the modifier. Under the OPAM model of the present invention, the informational structure of a complex phrase can also be represented by Object+Property, corresponding to the grammatical structure of the Head+Modifier. For example, in the phrase "digital camera", "digital" is interpreted as a property of the object of camera.

A document can include one or more paragraphs. Each paragraph can include one or more simple and/or complex sentences.

Details about other aspects of the Object-Properties Association Model is disclosed in commonly assigned U.S. patent application Ser. No. 12/573,134, titled "System and Methods for Quantitative Assessment of Information in Natural Language Contents", filed on Oct. 4, 2009, and Provisional Patent Application 61/143,140, titled "System and Methods for Quantitative Assessment of Information in Natural Language Contents" filed on Jan. 7, 2009, both by the present inventor.

In the above referenced disclosure, the focus is on the calculation of the information quantity of a specific text unit for a specific object. In the present disclosure, the focus is on identifying the general information focus of a document, a sub-segment of a document, or a document collection comprising a plurality of documents.

In the present disclosure, the OPAM model further states that the symbolic names of objects and properties, such as a word, a multiword phrase, or any sequence of words or phrases, referred to hereafter as a term or terms, also represent the information focus (of deferent degrees) of the linguistic units that contain them, such as a sentence, a paragraph, or a document, and thus can be treated as potential topics or subjects of interest of such linguistic units.

In the present disclosure, the OPAM model further states that while property names (or property terms) provide varying amounts of information about the object, the object names are of a higher degree of information focus in the sentence than property names. Thus, it is interpreted that the subject of a sentence in a document usually receives more information focus than other constituents of the sentence; and the head of a complex phrase usually receives more information focus than a modifier in the phrase. In OPAM model, this is the principle of degree of information focus based on the grammatical role of a term.

The model further states that for a given document, or a sub-segment of a document, or a document collection, the strength or the degree of the information focus represented by a particular term is further determined by the prominence of the term inside the document, or its sub-segments, or the document collection, herein called "the internal term prominence" (ITP), together with the prominence of the term outside the document or document collection, herein called "the external term prominence" (ETP).

In quantitatively assessing the strength of information focus of a term, the present disclosure first uses a weighting coefficient method to distinguish the degree of information focus on terms that play different roles in the linguistic structure.

And then, the present disclosure provides methods for the calculations of the values of both the internal term prominence (ITP), and the external term prominence (ETP), and methods for calculating the document-specific term prominence (DSTP) as a measure of the strength of a term's information focus in the document.

Figure 2:
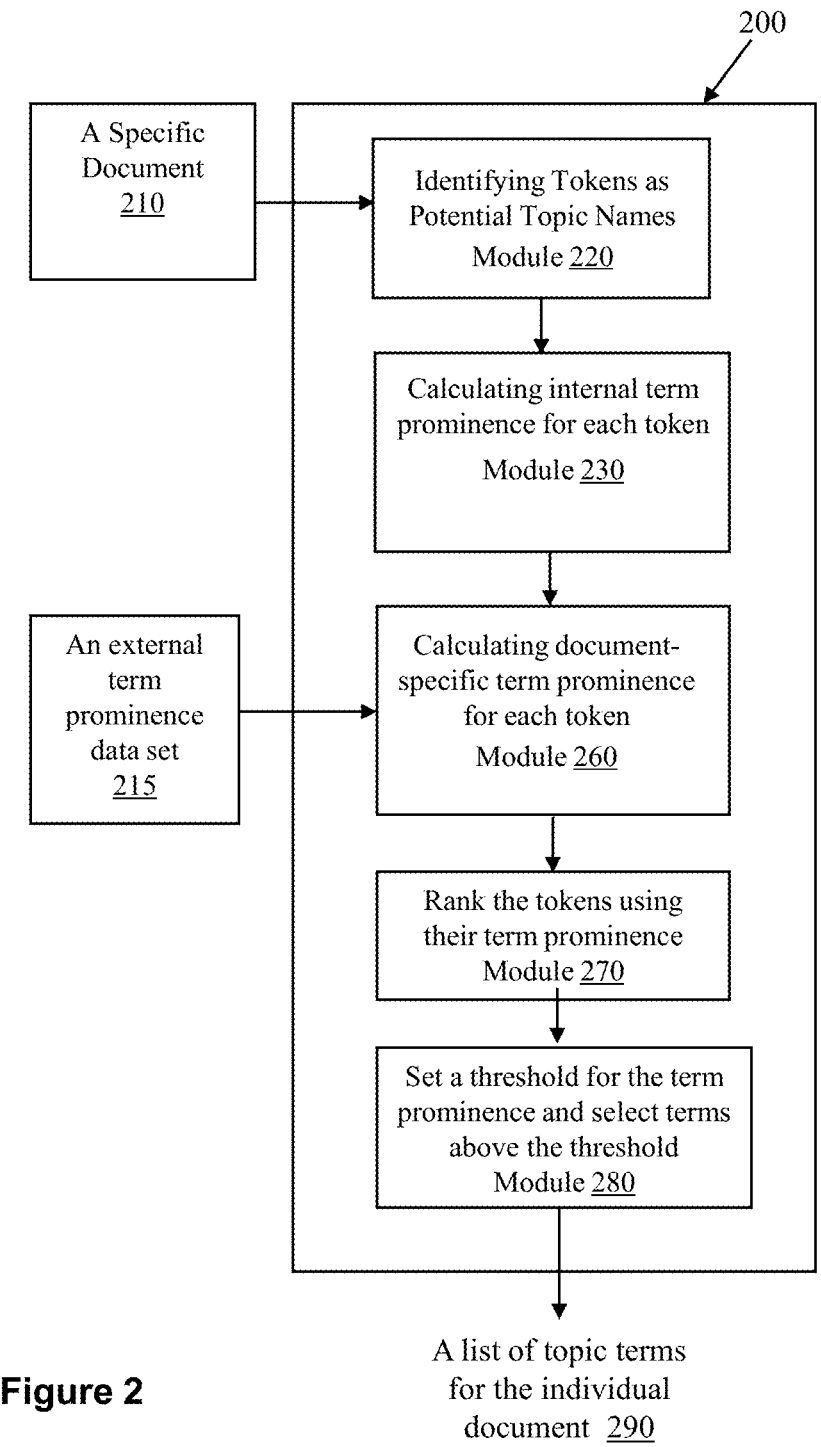
FIG. 2 is an exemplar system diagram for discovering potential topics in a specific document in accordance with the present invention.

FIG. 2 is an exemplified system diagram for discovering the potential topics of a specific document. A system 200 includes a plurality of functional modules. First, a specific document 210 is stored in the storage media in a computer system, and accessed by the system 200. Each term in the documents is extracted as a potential topic term by module 220. The Internal Term Prominence value for each token is calculated by module 230. On the other hand, an external term prominence data set 215 is also stored in the storage media in a computer system, and accessed by the system 200.

The data set 215 includes a plurality of terms; each is associated with a plurality of values representing the context-dependent prominence scores of the term in a large randomly selected document collection. FIGS. 4A and 4B show examples of such a data table showing hypothetical term names and associated values of their external prominence score.

For a specific document, the Document-Specific Term Prominence (DSTP) value for each token is calculated by module 260, using the values from module 230 and data table 215. Then, all the tokens are sorted in descending order by their DSTP values module 270, and a threshold value is determined in module 280 to select those that have their DSTP value above the set threshold, and the selected tokens are output by the system as a list of topic terms (290) of the specific document.

The present disclosure provides methods for first calculating the external term prominence data, with a special data structure to represent such data, and methods for storing the data for later use and reuse.

Figure 3:
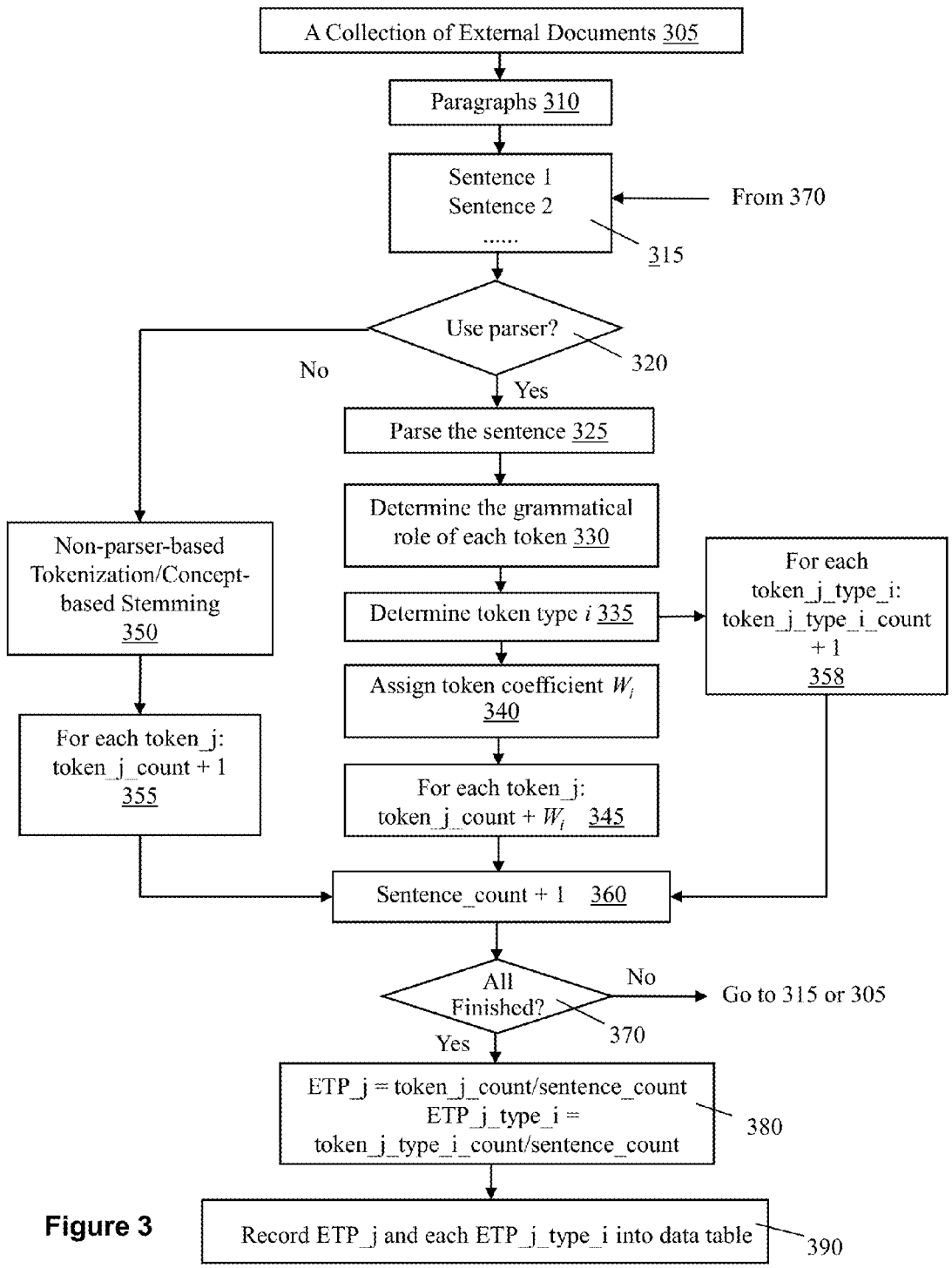
FIG. 3 is an exemplar flow diagram for automatically and quantitatively identifying external term prominence values from a non-specific collection of documents.

FIG. 3 illustrates detailed steps for calculating the external term prominence ETP score for a plurality of terms from a large randomly selected document collection. For each document in the collection (step 305), the document is broken into smaller units of paragraphs and sentences (Steps 310, 315).

Next, a decision is made whether a syntactic parser is to be used or not (320). The use of a syntactic parser is preferred, but not required.

A syntactic parser is in most cases a rule-based procedure, mostly embodied in the form of a computer program. It receives a string of characters, such as a sentence or an equivalent, and outputs a structural description of the grammatical relations between various components of the sentence. Syntactic parsers of various types can be freely or commercially available, or can be constructed based on rules one wishes to employ. The syntactic parser can be used to divide a complex sentence into simple sentences, and then divide a simple sentence into a subject and a predicate. It can further divide a multi-word complex phrase into its components such as a head and its modifiers. As it is known, a syntactic parser may not always produce a structural description of a sentence that conforms to the understanding by human language users.

Depending on whether a syntactic parser is used or not, for each sentence, words and/or phrases in the sentence are extracted as tokens or potential topic names using corresponding methods (steps 325, 350).

Depending on the specific language being processed, a process called stemming may be employed. This usually applies to Western languages, such as English and other members of the Indo-European language family, but not always applicable in many of the Eastern languages. When it applies, as an optional step, the presently disclosed methods provide a novel approach of concept-based stemming in the tokenization of the sentences in the raw data. The concept-based stemming merges only those words that are morphological variations of the names of the same concept or object name, for example, the plural form of a noun with the singular form of the same noun in English. In English, certain morphological variations of verbs, such as those for tense and aspects (e.g. "go", "went", and "gone") have their own shades of meaning and thus are not recommended for stemming. Variations for subject-verb agreement, such as "go" vs. "goes", are recommended for merging since they are referring to the same concept of an action. One aspect of the presently disclosed methods is that different rules of morphological consolidation can be used for specific languages. This concept-based stemming method is different from common practices in the conventional document retrieval or classification.

In some aspects, the so-called "stop words" can be included in the presently disclosed methods. Some words that are treated as "stop words" in conventional techniques are considered here to be also meaning-carrying units in the language, which may be part of the names of potential properties of certain objects. For example, "the" and "a" in English are conventionally excluded from text analysis as non-meaning-carrying words. However, phrases such as "a house" and "the house" can be very different in meaning under different contexts. In a legal document about the ownership of a house, a sentence "He owns a house" can have a very different consequence from the sentence "He owns the house". Since the present system and methods involve the meanings of natural languages, such conventional "stop word" can be included.

If a parser is used, as in step 325, each sentence is parsed by the parser to identify the grammatical components of the sentence such as the subject, the predicate and detailed structures within the subject and the predicate, or other parts of the sentence (step 330). For a multiword complex phrase, the parsing operation can identify the head and the modifier of the phrase.

Each token in the sentence is assigned a token type according to its grammatical role in the sentence as determined by the syntactic parser (step 335). An exemplified Token Type definition can include the following:

If the token matches the subject, the token is marked as a Type 1 token.

If the subject is or contains a multi-word phrase and the token is the head of the multiword phrase, the token is marked as a Type 2 token.

If the subject is or contains a multi-word phrase and the token is a modifier in the multiword phrase, the token is marked as a Type 3 token.

If the token matches the predicate of the sentence, the token is marked as a Type 4 token.

If the predicate is or contains a sub-phrase and the token is the head of the sub-phrase, the token is marked as a Type 5 token.

If the predicate is or contains a multiword phrase and the token is a modifier in the multiword phrase, the token is assigned as Type 6.

If the token is in any other text in the sentence, the token is marked as a Type 7 token. As described above in relation to OPAM, different types of tokens may represent different degrees of information focus as a result of their being in different grammatical roles in the sentence.

Each type of token i is then assigned a weighting coefficient value (step 340). The weighting coefficient, $W_i$, can have an exemplar value between 0 and 1, the magnitude of which reflects the different degrees of likelihood that such a token may be an information focus in the sentence. Using the example of the Token Type definition described above, $W_1$ (for a Type 1 token) may be assigned a value of 1 because a term as the subject of a sentence is more likely to represent the information focus of the sentence than other types of tokens in the sentence. Thus, if the j-th token is a Type 1 token then the parameter "token_j_count" is incremented by 1 (345). Similarly, values of other weighting coefficients can be exemplarily set as $W_2=0.9$; $W_3=0.8$; $W_4=0.7$; $W_5=0.6$; $W_6=0.5$; $W_7=0.4$ for the corresponding types of tokens in accordance with the decreased likelihood that a token may represent the information focus of the sentence. In general, instead of simply counting one for each occurrence of the jth token, the contributions to "token_j_count" are the token's respective weighting coefficients that are associated with the specific type the token is in. This is mathematically equivalent to each token count being scaled by the respective weighting coefficients according to the type the token is in.

For the purpose of recording into the data structure the raw external term prominence values that are not weighted or scaled by the weighting coefficient associated with the corresponding token type, a plurality of token counters are set up for each token type i that the jth token may possibly be in. Step 358 records the count of each token type the jth token occurs in as token_j_type_i_count. So if there are a total of N token types such as defined previously, there will be N token type counters for a token for this purpose. Steps 340 and 345 are skipped so no weighting coefficient is applied. In the present disclosure, the purpose of producing this data structure with raw values is to provide flexibility for customization in using different weighting coefficient values and ranges for each token type when such data are used in calculating the topic strength values of the corresponding terms in specific documents or document collections.

If a parser is not used (step 350), as a follow up to a negative answer to the question in the step 320, the sentence bypasses the parsing and the token type and weighting coefficient assignment process from step 325 to step 345.

When this is the case, first, for the tokenization of the sentence, other methods such as single-word tokens or multi-word n-gram methods can be used (step 350).

Then, for each token in the sentence, the parameter "token_j_count" is simply incremented by 1 if the j-th token occurs in the sentence at least once (step 355). Optionally, this case of not using a parser can be treated as a special case of using the parser where the parser does not label the token with any grammatical role, and a special token type, such as type 8, can be assigned to the token to indicate that no grammatical roles are distinguished, so that all occurrences of the tokens are treated the same, or the weighting coefficient of type 8 token can be assigned the value of 1.

After all tokens in the sentence are counted, the parameter "sentence_count" is next incremented by 1 (step 360). The parameter "sentence_count" tracks the total number of sentences that passes the step 320, each of which may include potential topic terms as the information focus associated with the document. Steps 310 to 360 are repeated until all the sentences in the paragraphs and the documents are finished.

Step 370 checks if all the sentences are finished. If the sentences in the paragraphs of the document are not finished, the steps from 315 to 360 are repeated until all sentences in the document are finished. If there are additional documents in the collection, steps 305 to 360 are repeated until all the sentences in all the documents are finished.

The external term prominence for the j-th token is the cumulative "token_j_count" divided by "sentence_count", the total number of the sentences in the document collection (step 380). External term prominence for the j-th token ETP_j has a value between zero and one. The un-weighted raw external term prominence for each token type i of the j-th token ETP_j_type_i is the cumulative "token_j_type_i_count" divided by "sentence_count" (380). ETP_j_type_i also has a value between zero and one using the exemplified counting method above.

In step 390, the ETP_j and ETP_j_type_i are written into their respective fields for the j-th token in a data table.

It should be noted that Token Type definition as described in the above example can include different variations, and the weighting coefficient W can be assigned different values.

In some embodiments, the number of sentences selected in the random document collection can be a portion of the documents in step 315. The "sentence_count" can be adjusted accordingly.

In some embodiments, the text unit for counting tokens and computing ETP, and ETP_type_i can be paragraphs or documents instead of sentences. Paragraphs as text units can be viewed as a special case of treating the whole documents as text units when a document contains only one paragraph.

For example, when paragraphs are used as the text unit for calculating the term prominence, one exemplar method is that if a jth token occurs in a paragraph multiple times and in different token types, the parameter "token_j_count" is incremented only once for each paragraph it occurs in, either by the highest weight coefficient value Wi max if a parser is used, or by the value of one if no parser is used, no matter how many times the token occurs in that paragraph, and no matter what other token types it may be in. The external term prominence for the jth token is calculated by dividing the cumulative "token_j_count" by the cumulative "paragraph_count".

The same methods are applicable when the text units used are whole documents instead of paragraphs.

The present disclosure includes a unique data structure for a pre-constructed data set 215 for use with discovering the document specific term prominence. FIGS. 4A and 4B illustrate exemplified data structures with data values produced by the method shown in FIG. 3. In this data structure, a term is associated with a plurality of fields each of which stores a numerical value that represents the external term prominence of this term in various contexts. FIG. 4A shows term values when a parser is used and not used, and when paragraphs and documents are used as the counting text units.

FIG. 4B shows the data table with raw external term prominence data for each token type as cited in steps 358, 380. The values in each field are calculated without applying the weighting coefficient corresponding to the token type, so that customization can be performed later with different weight assignment scheme if needed. Take the term "computer" for example. The data structure presents the external term prominence values of this term in a random collection for its respective roles as the subject (Type 1), the predicate (Type 2), the head of a multiword phrase in the subject (Type 3), the modifier of a multiword phrase in the subject (Type 4), the head of a multiword phrase in the predicate phrase (Type 5), the modifier of a multiword phrase in the predicate phrase (Type 6), and its other roles in a sentence (Type 7). The data structure also includes a field that stores the prominence value of the term when no such grammatical roles are distinguished (Type 8). This is also the case when no parser is used. For situations where lower precision can be tolerated, analysis without a parser can reduce cost.

It should be noted that the data structure can also include fields for data obtained from other methods based on the principles of the present disclosure but are not exhaustively listed above.

As is shown in FIG. 2, the system 200 uses such an external term prominence data set 215 produced by the above methods to calculate the topic prominence of terms in specific documents.

As has been described earlier in relation to OPAM, and shown in FIG. 2, a principle in the present disclosure is that the prominence of a term as the information focus in a document is determined by two aspects of the term:

1) the prominence of the term inside the document, called "the internal term prominence"; and 2) the prominence of the term outside the document, called "the external term prominence".

Basically, the corresponding steps in producing the external term prominence data above can be repeated for the calculation of document internal term prominence.

Figure 5:
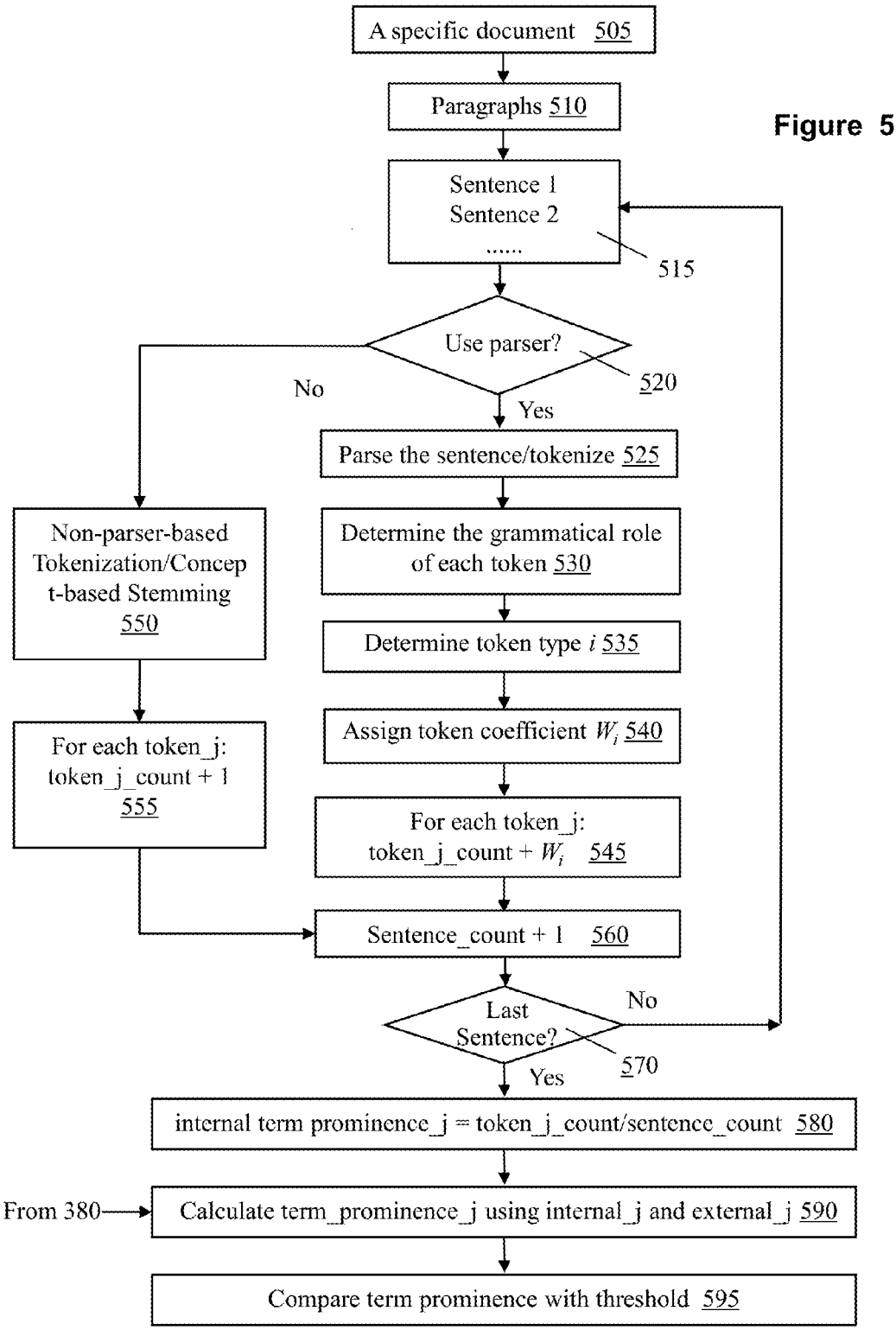
FIG. 5 is an exemplar flow diagram for automatically and quantitatively identifying topics in a document.

FIG. 5 illustrates detailed steps for calculating the internal term prominence ITP score for each term in the document. For a document in (step 505), the document is broken into smaller units of paragraphs and sentences (Steps 510, 515).

Next, a decision is made whether a syntactic parser is to be used or not (step 520). The use of a syntactic parser is preferred, but not required. However, if the data in the external term prominence data set in FIG. 4A and FIG. 4B are produced with a syntactic parser, the parser should also be used for the production of the internal term prominence to avoid inconsistency.

Depending on whether a syntactic parser is used or not, for each sentence, words and/or phrases in the sentence are extracted as tokens or potential topic names using the corresponding methods (steps 525, 550).

As described above when producing the external data set in (step 525) and (step 550), depending on the specific language being processed, a process called stemming may be employed, and a decision is made whether to included the so-called "stop words" or not. The decision and the stemming process should be the same as those for producing the external term prominence data set to avoid inconsistency.

If a parser is used, as in step 525, each sentence is parsed by the parser to identify the grammatical components of the sentence such as the subject, the predicate and detailed structures within the subject and the predicate, or other parts of the sentence (step 530). For a multiword complex phrase, the parsing operation can identify the head and the modifier of the phrase.

Similar to the steps in FIG. 3 for external term prominence data production, if a parser is used, each token in the sentence is assigned a token type according to its grammatical role in the sentence as determined by the syntactic parser (step 535). The same Token Type definition used for the external term prominence data production as exemplified above should also be used for the internal term prominence data production. The example is repeated below for convenience:

If the token matches the subject, the token is marked as a Type 1 token.

If the subject is or contains a multi-word phrase and the token is the head of the multiword phrase, the token is marked as a Type 2 token.

If the subject is or contains a multi-word phrase and the token is a modifier in the multiword phrase, the token is marked as a Type 3 token.

If the token matches the predicate of the sentence, the token is marked as a Type 4 token.

If the predicate is or contains a sub-phrase and the token is the head of the sub-phrase, the token is marked as a Type 5 token.

If the predicate is or contains a multiword phrase and the token is a modifier in the multiword phrase, the token is assigned as Type 6.

If the token is in any other text in the sentence, the token is marked as a Type 7 token.

As described above in relation to OPAM, different types of tokens may represent different degrees of the information focus as a result of their being in different grammatical roles in the sentence.

Each type of token i is then assigned a weighting coefficient value (step 540). The weighting coefficient, $W_i$, can have an exemplar value between 0 and 1, the magnitude of which reflects the different degrees of likelihood that such a token may be an information focus in the sentence. Using the example of the Token Type definition described above, $W_1$ (for a Type 1 token) may be assigned a value of 1 because a term as the subject of a sentence is more likely to represent the information focus of the sentence than other types of tokens in the sentence. Thus, if the j-th token is a Type 1 token then the parameter "token_j_count" is incremented by 1 (step 545). Similarly, values of weighting coefficients for other token types can be exemplarily set as $W_2$=0.9; $W_3$=0.8; $W_4$=0.7; $W_5$=0.6; $W_6$=0.5; =0.4 for the corresponding types of tokens in accordance with the decreased likelihood that a token may represent the information focus of the sentence.

The parameter of token_j_count is incremented by the weighting coefficient Wi if the token is of type i.

If a parser is not used (step 550), as a follow up to a negative answer to the question in the step 520, the sentence bypasses the parsing and the token type and weighting coefficient assignment process from step 525 to step 545.

When this is the case, first, for the tokenization of the sentence, other methods such as single-word tokens or multi-word n-gram methods can be used (step 550).

Then, for each token in the sentence, the parameter "token_j_count" is simply incremented by 1 if the j-th token occurs in the sentence at least once (step 555). Optionally, this case of not using a parser can be treated as a special case of using the parser where the parser does not label the token with any grammatical role, and a special token type, such as type 8, can be assigned to the token to indicate that no grammatical roles are distinguished, so that all occurrences of the token are treated the same, and the weighting coefficient of type 8 token can be assigned the value of 1.

After all tokens in the sentence are counted, the parameter "sentence_count" is next incremented by 1 (step 560). The parameter "sentence_count" tracks the total number of sentences that passes the step 520, each of which may include potential topic terms as the information focus associated with the document collection.

Steps 510 to 560 are repeated until all the sentences in the paragraphs and the documents are finished (step 570). The document-internal term prominence for the j-th token is the cumulative "token_j_count" divided by "sentence_count" that is the total number of the sentences in the document (step 580). Internal term prominence for the j-th token ITP_j has a value between zero and one using the above exemplified counting methods.

As is with the production of external term prominence data, it should be noted that Token Type definition can include different variations, and the weighting coefficient W can be assigned different values, as long as they are consistent with the methods used in producing the external term prominence data.

Also as is with the production of external term prominence data, in some embodiments, the text unit for counting tokens and computing ITP can be paragraphs or documents instead of sentences, as long as they are consistent with the methods used in producing the external term prominence data.

In some embodiments, a single type of tokens, such as type 1, or a mix of a selected number of token types can be used without also using other types of tokens for the purpose of calculating the term prominence. One exemplar case for such a choice is when only the most likely topic terms need to be identified, such as type 1 or type 2 tokens.

With the internal term prominence data obtained from the above steps, and the external term prominence data available from the data set in FIG. 4A and FIG. 4B, the document-specific term prominence (DSTP) for the jth token as a potential topic name is calculated (step 590) using the internal term prominence for the j-th token ($ITP_j$) obtained in step 580 (FIG. 5) and the external term prominence for the j-th token (ETP_j) obtained from the data set 215 (FIG. 2).

Again, depending on the use of parser and depending on the text units being either sentences or paragraphs or entire documents, only the corresponding data in the data set in FIG. 4A should be used.

In some embodiments, customized weighting coefficient values can be used instead of the default values that are used in the production of external term prominence data set. In such cases, the data in FIG. 4B can be used with the customized weighting coefficient values with the raw data for each token type to re-calculate the external term prominence data for the use of producing the document-specific term prominence value.

In some embodiments, the document-specific term prominence (DSTP) for a jth token is computed by the following equation:

$$DSTP_j = ITP_j - ETP_j. \qquad \text{(Eqn. 1)}$$

Using this method, the DSTP value for a token or a term can be in a range between −1 and 1. It should be noted that although a DSTP value can be −1 for a token, when the data for the external term prominence is in a large enough quantity and truly from random sources, most of the negative DSTP values tend to be slightly below zero. Thus, in some embodiments, negative DSTP values can be assigned to zero so that DSTP always has a value range between 0 and 1.

In some other embodiments, the document-specific term prominence DSTP can be calculated using different formulae from the above, for example, using a formula:

$$DSTP_j = ITP_j * ITP_j / (ITP_j + ETP_j) \qquad \text{(Eqn. 2)}$$

One beneficial feature of the formula in Eqn. (2) is that DSTP does not have negative values.

Whether the embodiment is using sentences as the text units, or the paragraphs or documents as text units, the final document-specific term prominence DSTP is compared with a preset threshold value (step 595). Terms of which the DSTP value is greater than the preset threshold can be selected as the prominent topic terms of the document, and can be output as a topic list to the user interface or storage as shown in module 280 (FIG. 2).

Figure 6:
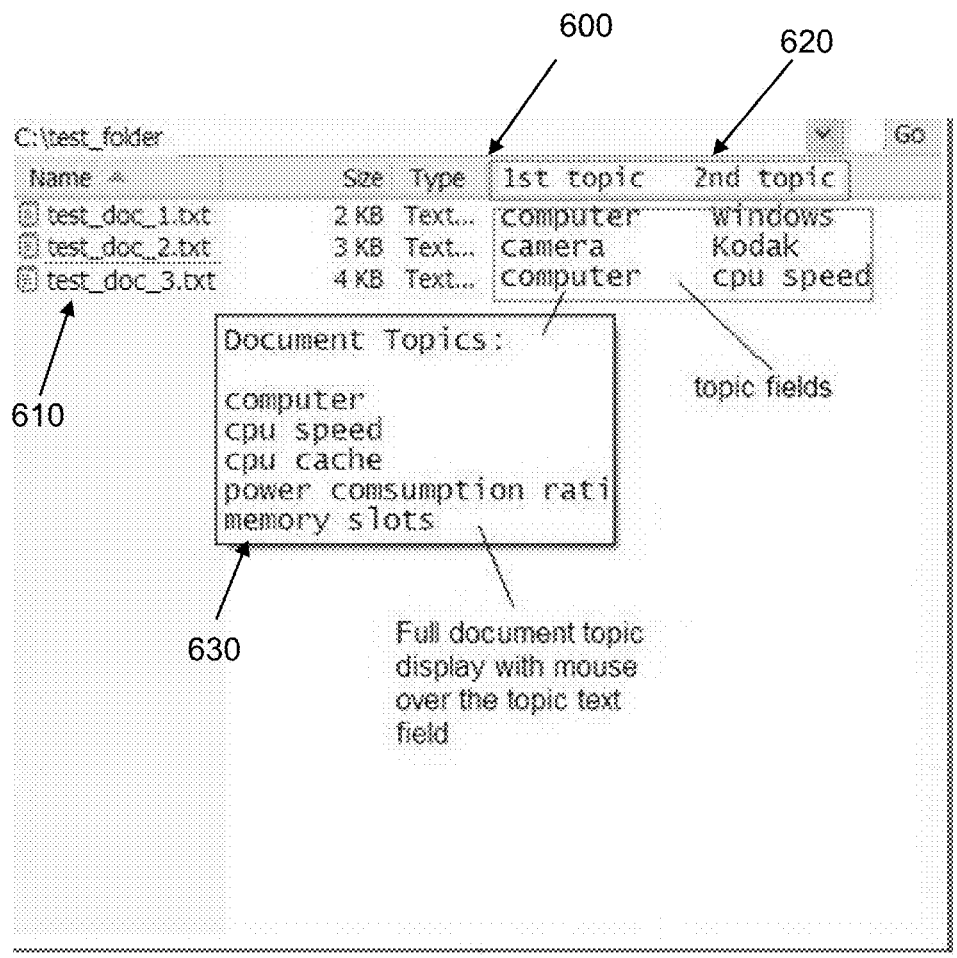
FIG. 6 is an exemplar user interface showing words or phrases displayed as topic terms or keywords in individual documents.

A list of topic terms identified in a document using methods described above can be used to highlight the content or the main subject matter of the document. Referring to FIG. 6, a list of files 610 are displayed in a file directory 600. In addition to file names, file sizes, file types, the most prominent topic terms 620 in the files can be extracted and displayed in metadata fields such as "keyword". When a user clicks on a file name, a pop-up window 630 can appear to show a list of topic terms in that file.

FIG. 7 shows a user interface 700 that lists emails in a user's email folder. In addition to commonly displayed information such as senders' names (i.e. "from"), subjects, dates, and sizes, the topic terms 710 extracted from the content of emails are displayed as keywords 720 in association with respective emails.

Other applications of displaying topic terms for a document are also disclosed in U.S. Provisional Patent Application 61/298,422, filed Jan. 26, 2010, and U.S. patent application Ser. No. 12/782,545, filed May 18, 2010, by the present inventor, It should be noted that the present disclosed methods are applicable to discovering topics in a portion of a document, a single document, or a collection of documents. Furthermore, the term prominence values of documents can be used as effective criteria to accurately rank documents in a search result from a search engine, or from any other information retrieval systems.

Document Indexing, Search, Retrieval, and Ranking Based on the Information Focus of the Documents Conventional methods for document indexing and its related search, retrieval and ranking are usually based on simple statistical information such as the frequency of the keyword in the documents. The frequency of keywords alone, however, is not always a reliable indicator of the document's relevancy to the search request. For example, an exemplar document D may consist of the following text.

"The camera is a new model that uses a rechargeable battery. It comes with a battery charger. But it can also use a non-rechargeable battery, so you don't need to carry the battery charger with you."

In this document, the most frequently used word "battery" occurred four times. However, it should be apparent to an ordinary English reader that the main topic or the information focus of the content is more about "camera" than about "battery". With conventional frequency-based approaches, this document will be considered more relevant to a query for "battery" than to a query for "camera" due to the relatively higher frequency of the keyword "battery", but it is apparent that the document provides more relevant information about "camera" than about "battery", even though the word "camera" occurred only once.

A key issue associated with the conventional approach is that it often cannot identify the correct information focus and thus cannot produce accurate search results.

In information retrieval, a common method of indexing terms in a plurality of documents is to first build a document term vector for each individual document, and then build a so-called "inverted index" by combining the individual document term vectors, such that, each term in the inverted index points to all the documents that contain this term, and when a term is queried, all documents that contain this term can be retrieved, and the results can be ranked according to a relevance measure of the document to the queried term.

FIG. 8A shows a conventional document term vector for a particular document with a term frequency vector corresponding to each term in the term vector. FIG. 8B is an exemplar format of a conventional inverted index for a document collection. In the inverted index, each term has a corresponding list called a posting, which contains the names or ID numbers of documents that contain the term, together with a frequency count of that term in the document. In this example, the frequency of the term is separated from the corresponding document name by a colon.

When a term, such as "computer" is queried, the system looks up the term "computer" in the inverted index in FIG. 8B, and retrieves the list of documents from the posting list of the term "computer", and ranks the documents in the output search result mainly based on the term's frequency as a measure of the relevancy of the document to the query. In such an approach, a document that contains more occurrences of the term "computer" will usually be ranked higher than a document that contains less occurrences of the same term or keyword.

The conventional frequency-based approach is simple and intuitive, but the results are often inaccurate and unreliable.

The presently disclosed system and methods take a different approach in determining the relevancy of a document to the search query. The presently disclosed system and methods look at the information focus of the document; build an index of the documents based on the information focus of the documents; and in serving a query for information, retrieve and rank the documents according to the strength of such information focus.

As described above, each term in a document can have a document-specific term prominence score DSTP. The topic list of a document produced using the present methods can include all unique terms in the document. Each unique term in the document has a term prominence score as a measure of its strength of being an information focus in the document. This topic list can be viewed as a document index or a document term vector. The term prominence scores associated with each term in the term vector can form a corresponding vector called "score vector".

In the present invention, the term prominence values are used in the document vector and the corresponding inverted index. For illustration purpose, the "term prominence value" can also be interchangeably called the "information focus score" hereafter.

FIG. 9A shows a document term vector based on the topic list produced from a document by the presently disclosed methods, and a corresponding "information focus score vector" consists of term prominence scores for the terms in the document term vector. Optionally, the scores can be normalized by a certain criterion.

FIG. 9B shows an inverted index based on a collection of document term vectors as exemplified in FIG. 9A, which shows information focus score in each term's posting list. In comparison with the conventional approach (FIGS. 8A and 8B), a high frequency of a specific term in a document does not necessarily correspond to a high information focus score for the same document.

Figure 10:
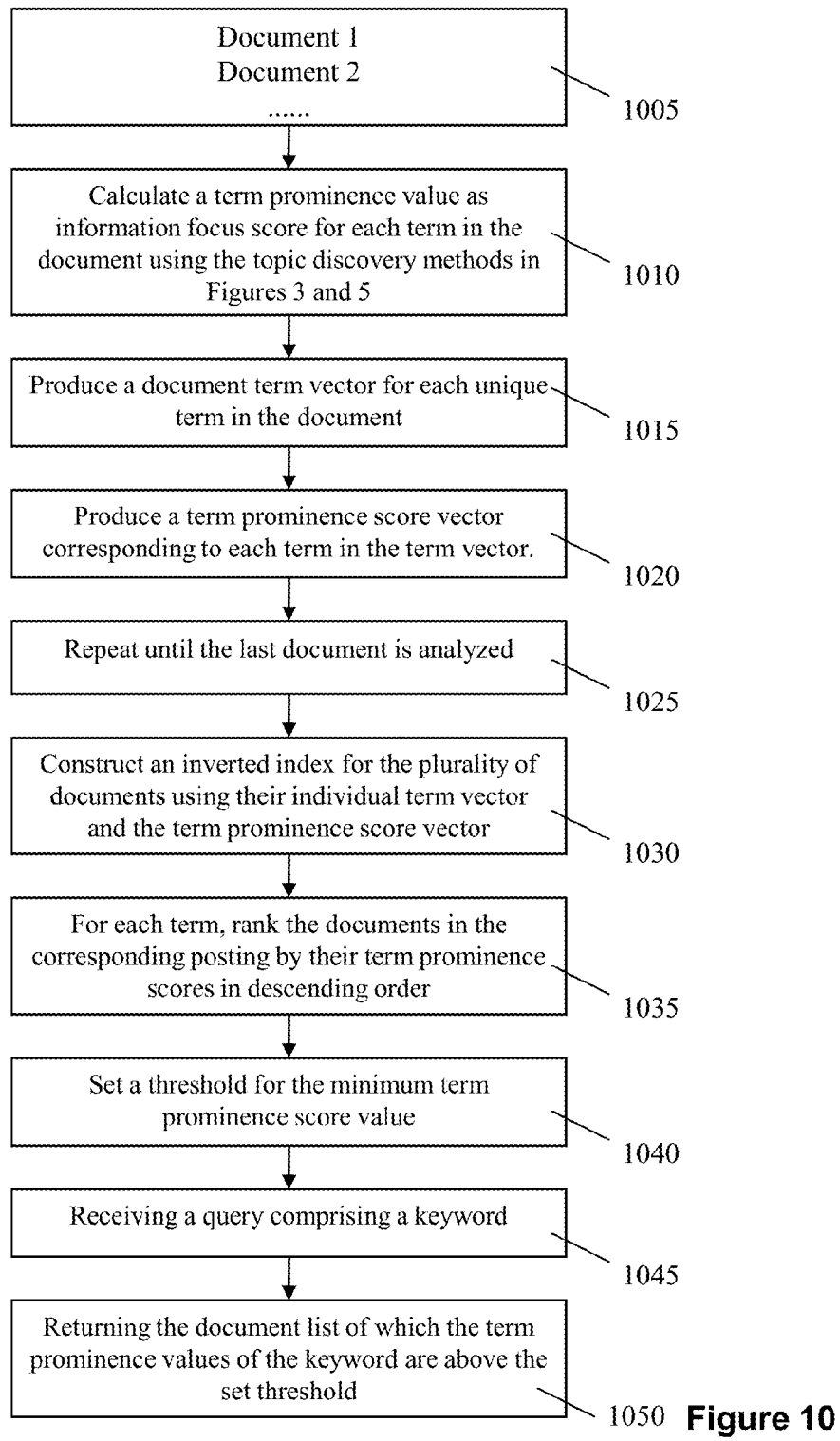
FIG. 10 is an exemplar flow diagram illustrating the process of indexing documents for search and ranking the search results using the topic discovery method in accordance with the present invention.

FIG. 10 illustrates detailed steps for ranking a plurality of documents in response to a specific query that matches a term in the inverted index. A plurality of documents are retrieved (step 1005). A term prominence value as information focus score is calculated for each term in each of the plurality of documents using the topic discovery methods in the present disclosure (step 1010). A document term vector for each unique term in a document is produced (step 1015). A term prominence score vector corresponding to each term is also produced (step 1020). The steps 1010 to 1020 are repeated until the last document is analyzed in step 1025.

An inverted index for the plurality of documents is constructed using their individual term vectors and the term prominence score vectors (step 1030). For each term, the documents in the corresponding posting are ranked by their term prominence scores in descending order (step 1035). A threshold is set for the minimum term prominence score value (step 1040).

When a query is received, a keyword in the query is identified (step 1045). If the keyword is matched with a term, the document list of which the term prominence values are above the set threshold are returned as the results to the query (step 1050). If no match is found, a "document not found" message is returned.

The search results (step 1050) are now ranked by the term prominence scores of the matched keyword in the documents, based on the information focus the term represents in the documents. The results using this method are more relevant to the user's query than the conventional methods that rank the results mainly based on term frequency.

It should be noted that the above description serves as an example for the presently disclosed system and methods. Other cases such as multiple term queries can also be handled in the same spirit of the present disclosure.

Producing and Displaying Section-Based Summaries for Documents

The presently disclosed system and methods can be used to identify prominent topic terms in a portion or a sub-segment of a document. In the present disclosure, a sub-segment of a document is treated as a special case of a full-length document object. The above described system and methods for topic discovery in a full-length document can be recursively applied to sub-segments of the document. This extension further enables a wide range of applications.

Different segments within a document can be identified by their formats. For example, many documents are internally written with different types of so-called markup languages, such as HTML, SGML, XML, etc., that contain information about the boundaries of segments inside the document, such as the "title", "heading", "body", etc. Other document segments may be specially marked by the authors with section headings of "Abstract", "Introduction", "Conclusion", and "Bibliography", etc. The presently disclosed system and methods can be readily applied to such sub-segments so that information focus of such segments can be identified and presented to the user for efficient information search or quick evaluation before committing time and effort to reading the entire content. In other examples, a page of a document, a section or a chapter of a book can also be treated as a segment of the document.

Figure 11A:
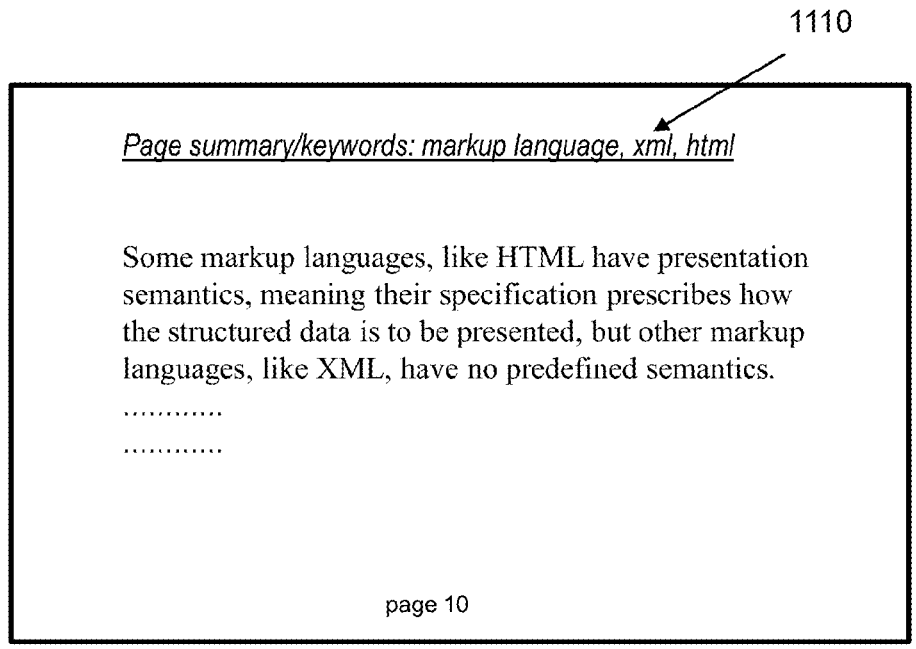
FIGS. 11A and 11B show examples of summaries with keywords for each page of a multi-page document in accordance with the present invention.
Figure 11B:
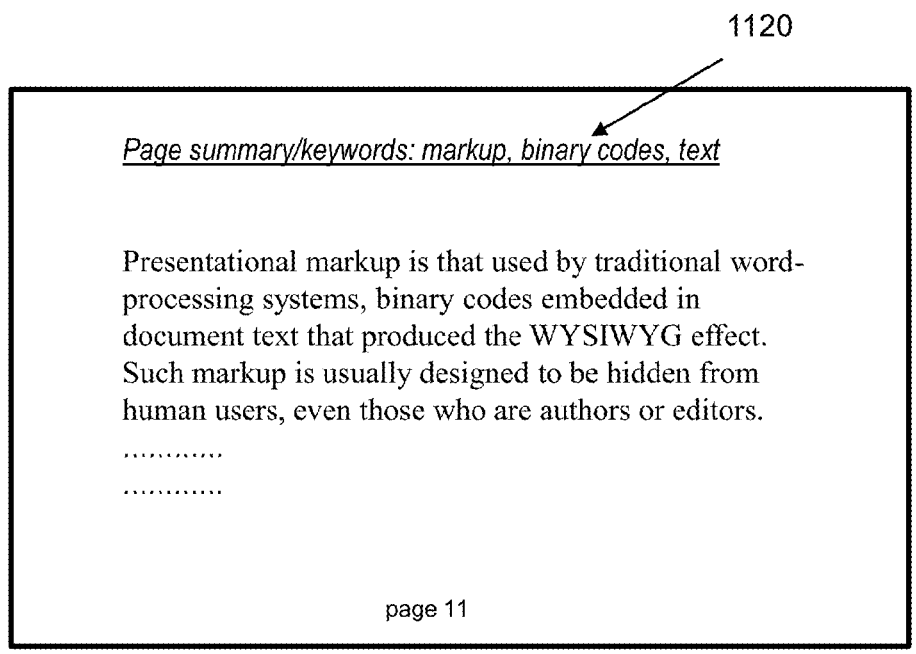

The presently disclosed system and methods can provide a section-specific summary or a keyword list to a document segment. FIGS. 11A and 11B illustrate keywords that contain the most prominent topic terms being displayed or printed on the top part or the header position of each page of a document. In this case, each page (e.g. Page 10 or Page 11 in FIGS. 11A and 11B) is treated as a sub-segment of the document. A user can take a glance at the summary line to decide if the content of the page may be of interest or not.

Some document are well-sectioned documents, such as patent documents, which usually have well-defined sections such as "abstract", "background", "summary of invention", "detailed description", and "claims". Often the abstract does not provide enough or pinpointing information about the main content, and the user may need to read more content to get an idea about the main topics of the disclosure, which can often be a time-consuming process. However, a summary line 1110 or 1120 consisting of either a list of keywords or a few sentences can be displayed or printed on the top part of each section. The keywords and sentences contain the most prominent topic terms. A user only needs to take a glance at the summary line of each section for an initial evaluation of the relevance of the contents.

Figure 12:
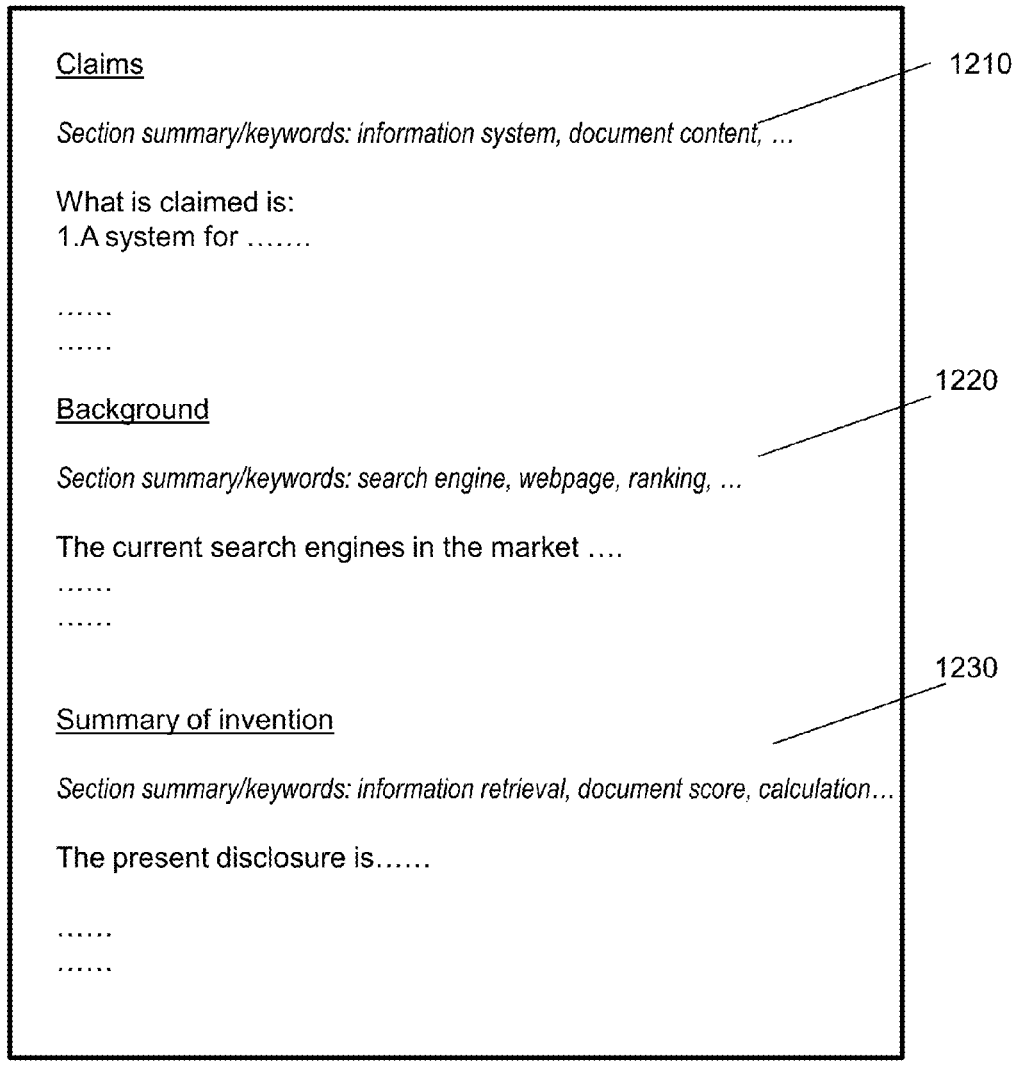
FIG. 12 is an exemplar product of displaying a separate summery/keyword line for each section or segment of a multi-section document in accordance with the present invention.

FIG. 12 is an example of such section-based summary lines 1210, 1220, 1230 displayed at the top part in each section of a hypothetical patent document. A summary for the entire document can be obtained by combining the summary lines 1210, 1220, 1230 for different sections 1310 (Claims, Background, and the Summary of Invention, etc.) as shown in FIG. 13.

Conventional Internet searches usually display a portion of the content of the web pages in the search results. However, the displayed portion of a page may not necessarily provide enough information about the entire content of the page.

Figure 14:
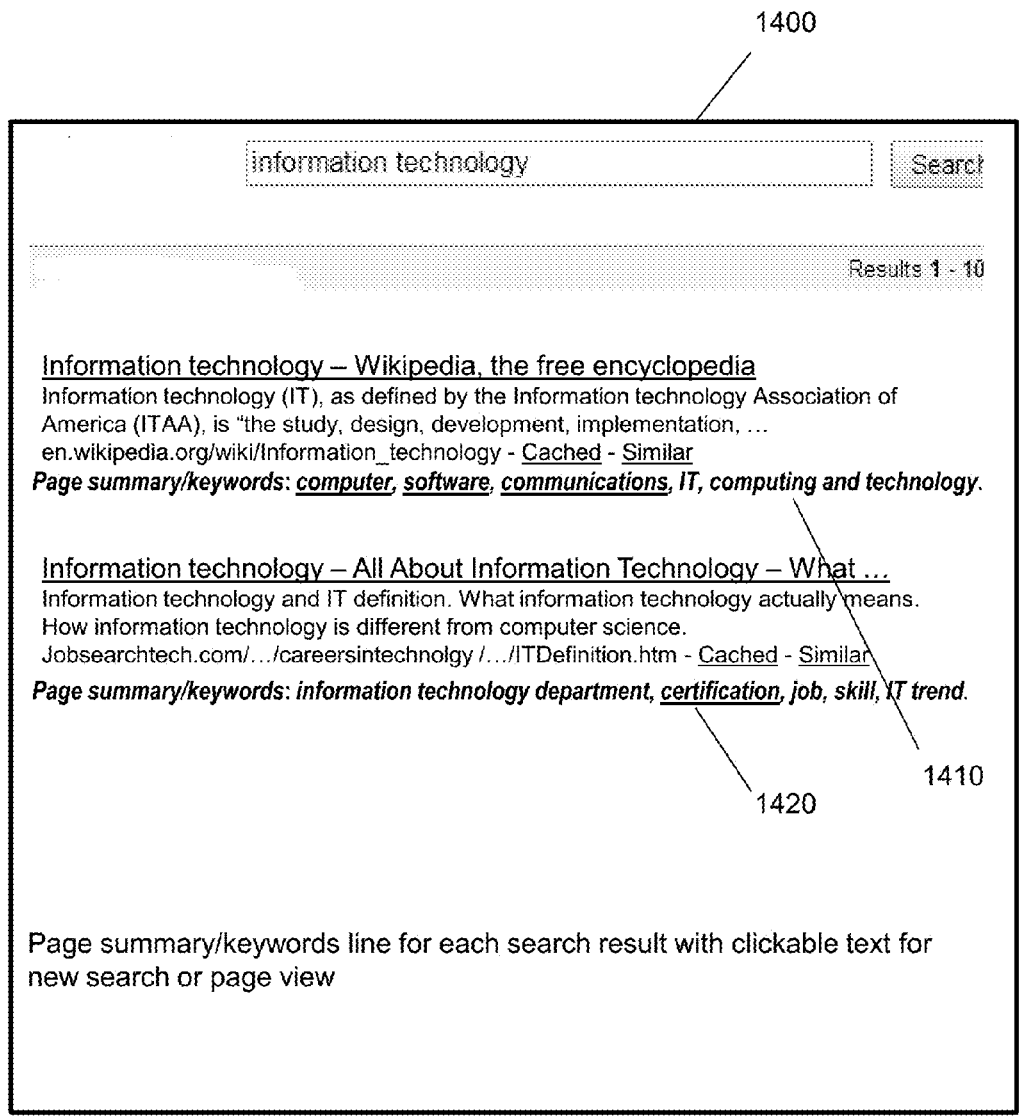
FIG. 14 is an exemplar product of displaying a page summery/keyword line for each Webpage returned in response to an Internet search in accordance with the present invention.

In the present invention, referring to FIG. 14, the summary or topics for a web page 1400 can also appear on the search result page of an Internet search. A list of prominent topic terms or sentences containing such terms is exemplarily displayed at the bottom part of each search result, so the user may take a quick look at the summary before clicking on the returned link to review the full page. The summary lines 1410 and 1420 allow users to immediately have a quick idea about the main topics of the page before committing more time and effort to reviewing the whole page. In the specific example in FIG. 14, the brief content provided the conventional search engines (known as the "teaser text") is from a small part of the page that has the best match with the query for "information technology". That part briefly talks about what information technology is about. However, the main content of the page is about the jobs in the information technology field, and this can be captured by the summary/keywords line produced by the presently disclosed system and methods. Thus, if a user is looking for information about what "information technology" is about, he/she can skip the link in 1420 without spending time in opening the page and reading the whole content. On the other hand, if the user is looking for job information in the information technology field, he/she can skip the link in 1410 to save time.

Furthermore, the terms in the summary line can be anchors of hyper text links so that if the user finds such terms to be of greater relevance or interest to the original query, he/she can click on the terms to either go to a linked page, or automatically launch a new search with that term as the query term.

The same method can be applied to other types of searches, such as the enterprise search, desktop search, or any other search, without deviating from the principle of the present invention.

Another example for producing and displaying section-based keywords or summaries is with emails. Conventional email systems display the emails in the user's Inbox or another folder as a list of headers or rows of metadata in the user interface that include columns such as "Sender", "Date", "Subject", "Size", etc., and require the user to select or open a particular email from the list to see the full messages of the email. When composing an email, the user usually follows the convention of writing a brief line of text in the "Subject" field, to indicate what the message is about. This field is very useful for the receiver to have an idea about the main topics of the email at a glance, and also offers the user to sort a list of emails by the alphabetical order of the words used in this field, such that emails of the same subject can be grouped together for quick action, such as review, moving, or deletion. However, there are often times when the text in the "Subject" field loses its subject-highlighting function.

One such case is that the user may not correctly phrase the intended subject matter.

Another case, which can be more often than the first case, is that once an email is initiated, it may form a thread from the receiver(s) and sender(s) replying to each others. Often, as the thread continues, the content of the email may shift to other topics that are different from what the original text in the "Subject" describes, and often, neither the sender(s) nor the receiver(s) may notice that the text in the subject field is no longer pertinent to the content, or even if they do notice, often they do not bother to change the text in the Subject field to reflect the latest topics. This natural tendency often creates a problem when the user wants to locate a particular email among a multitude of emails that have the same Subject text. The user may have to open each of such emails to see if one of them contains the information he/she is looking for. The user may also need to perform a full text search with the particular text as the keyword in the message body, but this is not always effective as well. One of the cases is that often the email system may offer by default a feature of including the original message in the reply, thus, when the thread gets long, the same text may be repeated in many of the messages that have the same text on the Subject line. When this is the case, even if the search finds the text, the messages that contain the text can still be a long list, and the user may need to spend time going over many unrelated messages or texts in the message body before he/she can locate the content that is being looked for.

FIG. 15A is an exemplar case of a conventional email Inbox in a user interface. This example shows an email thread with the Subject of "Healthy food info" started by the original sender, and was responded by a number of recipients during a period of over a month. In the conventional display, the reader cannot know from the header lines of the messages what type of new information each of the replies in the tread contains. Hypothetically, in replying to the thread, each recipient added new information, but the original topic about healthy food gradually shifted to other health-related topics such as food safety, food wrapping, then to water quality, then to exercise, etc. If the user wants to review the newly added information about water filter, he/she may need to open each email and read the content of all the emails.

The presently disclosed system and methods can be used to identify and display topics in email threads, forum threads, and other incremental information contents. Topic terms in a section of an email thread can be identified and displayed. In particular, new additional topics in the reply portion of an email thread can be extracted to show new information contained in the email responses.

The present invention first identifies the recently added text in an email thread, then applies the methods of topic-discovery as described above to identify the main topics of the recently added text, then, it adds a special column in the folder view or list view of the email user interface, with a column heading such as "New Topics" either before or after the Subject column, and displays the most prominent topic terms (words or phrases or sentences) extracted from the recently added content in the thread, (whether the original message is included or not). This provides an effective solution to the two problems described above. First, if the user's original text in the Subject line does not correctly reflect the content, the topic terms from the content can provide additional information about what is actually being talked about in the content. Secondly, and often more importantly, the user can immediately know from the topic terms in this field if the subject of the original thread is changed or not, and if a user needs to locate a particular new content from a long thread of emails that all have the same text in the Subject line, the user can take a quick look at the "new topics" column, without having to open each of such message and read it through, or without having to perform a full text search and still having to spend time locating the information from a long list of search results, especially when they contain the queried text as a result of the users having included and accumulated the original messages in their replies multiple times.

Referring to FIG. 15B, the main topics of newly added content in each reply are identified and extracted, and an additional column of "New Topics" is added to the user interface, in which the main topic terms in the newly added content in the replies are displayed next to the original Subject field. Form the exemplar case shown in FIG. 15B, it can be seen that the topic naturally shifted from "Healthy food info" to "weekend exercise", including intermediate topics of food safety, water quality, etc. This provides an efficient way for the user to easily locate the information among a long list of possible candidates.

In identifying the new topic terms and displaying them to the user interface, the system and methods in the present disclosure first identify and extract the recently added text in an email. In the case of the first email in the thread, this is the original text the sender writes. In the case of a reply and the subsequent replies in the thread, the system and methods in the present disclosure identify various types of information indicating the boundaries of the recent incremental content. One exemplar indication is the timestamps in the message header. In this exemplar case, the system locates the message body text between the recent timestamp and the next recent timestamp. If the system does not find a second timestamp, then it treats the message as the initiating message and extracts the entire text from the message body for analysis.

The system then applies the methods in the present disclosure as described above to identify the main topics of the recently added text, and then, it populates the special column of "New Topics" 1510 with the topics terms in the corresponding email.

In some embodiments, the heading of the new column can be "New Topics". In some embodiments, the heading of the new column can be "The latest topics", and in yet another embodiment, the column heading can be "New Subject". The new column can be positioned either before or after the original 'Subject" column in the folder view or list view of the email user interface.

The topic terms in the column can be sorted in different orders, such as the alphabetical order, so that the user can easily locate the content without performing a search. This is particularly useful when the user does not know or does not remember what exact keyword to use when performing a full text search.

It should be noted that the above system and method of identifying the particular or the recent incremental content and the information focus of such content and displaying such information to the user can be applied to other incremental contents, such as Web-based forums, discussion groups, and blogs.

User Interface for Highlighting Content to Facilitate Document Search

Conventional methods of displaying information about documents or emails are not capable of highlighting the content of the documents by automatically extracting such key information. Some conventional methods display a part of the document information known as "metadata" that are based on the system-generated information such as the time the document is created, modified, or the time an email is received, and its size, author/sender, etc., rather than based on user-created contents. Other conventional methods extract the first few characters or words of a document or email and display them in a way commonly known as "preview". But none of these conventional methods can perform a content analysis and identify the main topics of the documents or emails by looking at the context, or grammatical role or structure, or the related frequency of the terms in the document.

In contrast, the present disclosure provides a method and user interface of content-highlighting to facilitate the search of needed documents by automatically displaying a term or a summary for a document, or a document segment, or a document collection based on one or more elements extracted from the user-created content, using a method that determines the importance of such elements such as a word or a phrase or a sentence, etc., based on the context, or the grammatical role or structure, or the related frequency of the elements in the document, rather than based on the position of the elements such as at the beginning of the document or at a random position in the document, or based on system-generated information such as the conventional metadata.

In U.S. patent application Ser. No. 12/715,385 filed by the present inventor, a system and methods and user interface are disclosed that use a topic-discovery methods to identify the topic terms of a document, an email, a collection of documents or emails, and display such topic terms to the user in a user interface. In the present disclosure, the concept of documents is further extended to include the sub-segments of documents of various types including emails and other documents as described above, and the methods of identifying the topic terms and displaying such topic terms and summaries are also extended to such segments.

Both the present disclosure and the aforementioned disclosure also provide methods for determining the importance of such elements as described above.

The present disclosure further generalizes the method and user interface for highlighting the key information of the content with automatically extracted keywords or summaries.

Figure 16:
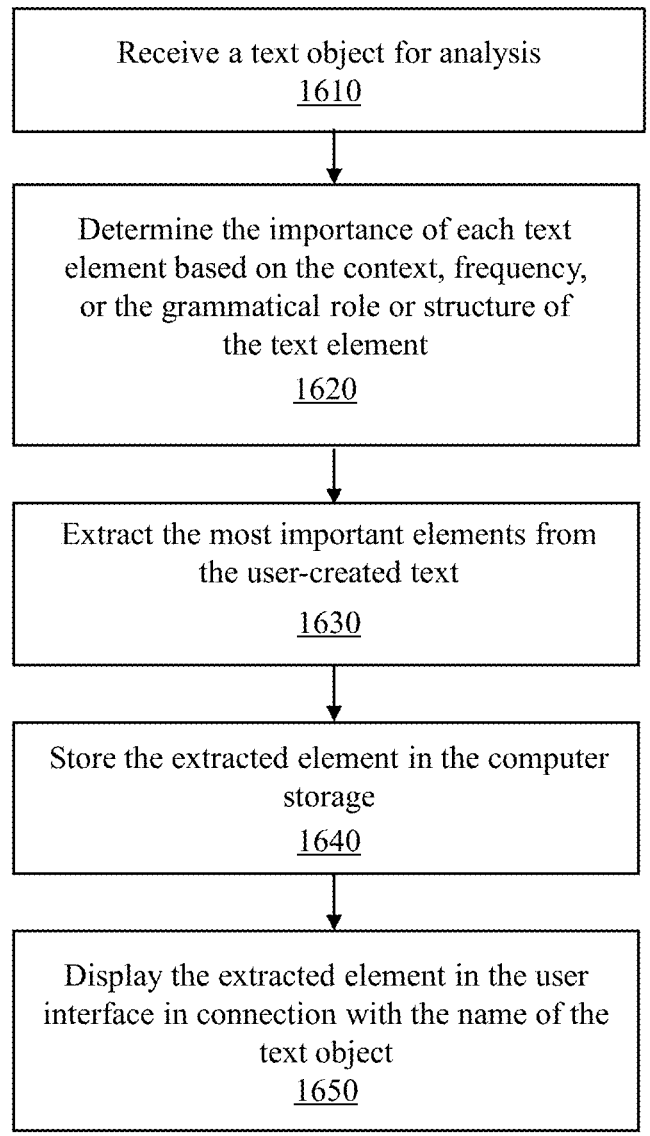
FIG. 16 is a flow diagram illustrating the process of identifying and displaying the important text elements in text content and displaying such text elements.

FIG. 16 shows a flowchart for identifying and displaying the important text elements in a text object. A text object is a general term for documents of various types, including regular documents with text, and emails and web pages, and their sub-segments, and a collection of multiple instances of such documents or emails, or sub-segments, etc. A text object containing user-created content is received (step 1610). The importance of each element in the text object, such as a word, a phrase, etc., is determined based on the context, or frequency, or the grammatical role or structure of the text element (step 1620). The important text elements are extracted (step 1630). The extracted text elements are stored in a computer storage device, such as the hard disk or memory or both (step 1640), and displayed in a user interface in a way that is related to the name of the text object, such as in the form of a tag, a label, or a summary of the content of the text object (step 1650).

Searching Emails or Threaded Contents by Text Segments

The present invention can provide fast and accurate search of emails or other documents with cumulative contents as a special type of documents, and for reducing or avoiding the processing of the same content multiple times.

The following description is based on email as an example for illustration.

As shown with FIG. 15A, the text in an email that is part of a thread which contains text from previous communications can be divided into at least two parts. The first part is the newly entered text by the sender, and the second part is the text from previous communications often known as the "included text". Such parts or segments of the email content can be identified by boundary information that indicates either a time or a date or a person or a source or destination that is associated with the text.

While topic terms can be extracted from different parts of an email, the present system can also selectively index the different parts of an email, instead of the entire email thread. In conventional email search, when the user enters a keyword that is used in the originating email of a long email thread, contents of all subsequent emails in the thread can be retrieved due to the fact that all emails in the thread contain the "included message" that contains the keyword in the originating email. Users can be confused as to which one of the search result is the one he is looking for, and may have to go through a long list of candidates to find the one he is looking for.

In one embodiment, the present invention first divides the text in an email into two parts, the newly entered part, and the "included text" part, and selectively indexes only the newly entered part, such that users can effective narrow down the search results to the first email in a thread that contain the search keywords.

In another embodiment, the present invention further provide user interface object to allow users to indicate whether he or she wants to search only in the newly entered text or in all text in the emails.

Figure 17:
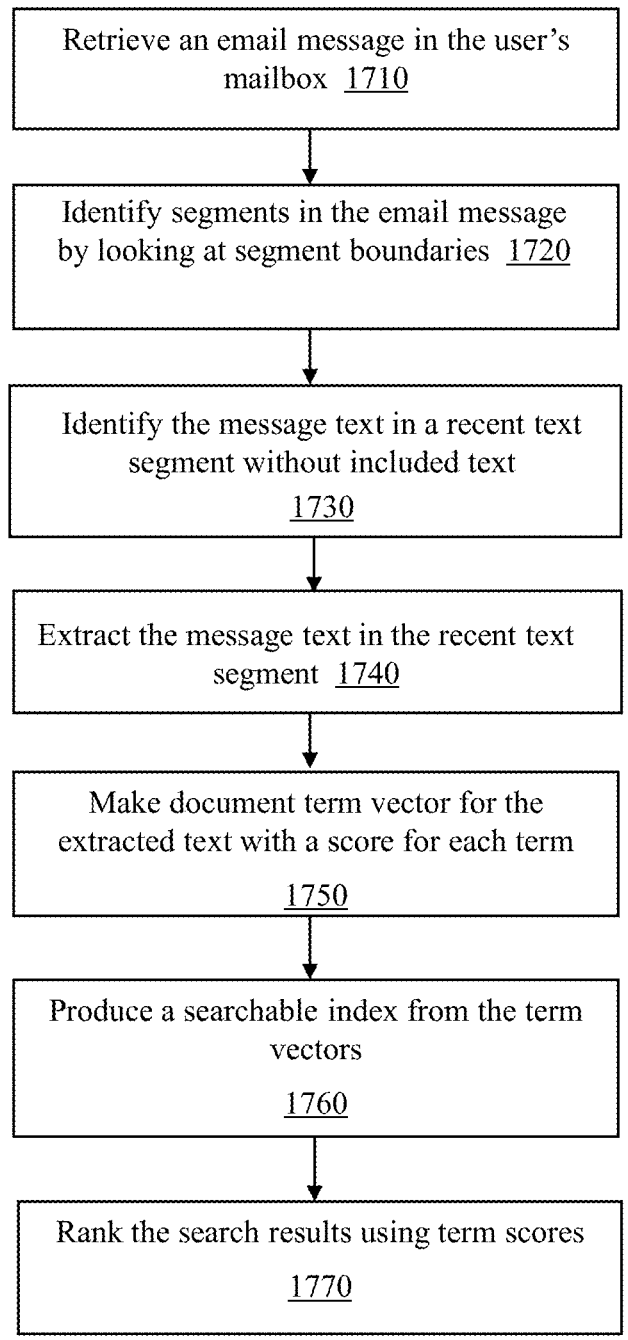
FIG. 17 is a flow diagram illustrating the process of searching by new text segments in emails.

FIG. 17 illustrates a flow diagram for indexing text in new message content, particularly in a thread of email messages. An email thread includes a series of email messages in reply to each other. In the present system, an email message is received (step 1710). The sub-segment can, for example, be only the recently added content in the email message body that may or may not include text from previous emails. The system first detects the boundaries of the most-recent segment (step 1720) using timestamps or other boundary information of email responses in an email thread. The system then extracts the content in the identified segment (step 1730), and treats the extracted content as a standalone document (step 1740). A document term vector is created for the extracted content (step 1750). The method produces a searchable index of the emails in the user's mailbox for only the newly-added text in each email without the included texts (step 1760). In one implementation, this index can be used as a secondary index to the conventional index which includes all texts in all emails in the user's mailbox. The search results from the segment index can be ranked using term prominence values (step 1770). Alternatively, the relevance ranking of the segment indexes can also be based on conventional ranking methods.

FIG. 18 illustrates an example of a common email thread that is received by the user. The user is part of an email thread that is discussing when to schedule a group meeting, and the user has received email message 1810 which is the newly entered message by the sender, along with the previously included messages 1820. The present invention can selectively index email message 1810, and ignore the included messages 1820. In one embodiment, if the newly entered message by the sender is determined to be empty, the present system can choose to index the most recent email message 1830 in the included messages 1820.

Producing a Topic List for a Document Collection from the Topic Lists of Individual Documents The presently disclosed system and methods can identify topic terms in a collection of documents using topic lists produced from individual documents.

In some embodiments, for a document collection containing N documents, the presently disclosed system and methods first produce the topic term list for each individual document as described above. Then, for each specific topic term, the system and methods count the number of documents this term occurs in and calculate a cumulative sum of the term prominence score from each individual score associated with each document the term occurs in. Then the cumulative sum is divided by the total number of documents the term occurs in. The resulting average term prominence score can be used as the term prominence score of that term in the entire document collection. The process is repeated for each term in the document collection, and a candidate topic list can be compiled from all terms in the document collection. A threshold can be determined to select those that have the prominence value above the threshold. Then the selected term list is sorted in descending order by the prominence score, and output as the topic list of the document collection.

A topic list of a document collection can be used as pre-written queries for searching the needed documents in the collection, and as category nodes for categorizing the document in the collection. Detailed methods for the application of such a topic list is disclosed in U.S.

Patent application Ser. No. 12/782,545, filed May 18, 2010, by the present inventor. It should be noted that browsable search by a topic list is applicable to individual documents, a collection of documents, and sub-segments of an individual document.

Additional Methods of Determining Term Prominence or Importance

In the following description, for ease of illustration, the phrase "prominence score" is interchangeably used with the phrase "importance score". The word "term" in the present invention can be one or more words or phrases, or a sentence. Each occurrence of a term in the text content is a token instance of the term. A token count refers to the count of token instances of a term.

The methods for determining the term prominence score in the above referenced disclosure are so far mainly based on the grammatical analysis of the text in a document or document collection. These methods assume the identification of the grammatical roles of the terms in the text for determining the prominence of the terms.

Generally, in order to identify the grammatical roles of the terms in sentence, a syntactic parser is needed. As has been described above, the accuracy of the analysis results depends on the complexity of sentences being analyzed, and on the quality of the parser itself. Sometimes the parser may produce inaccurate results, and sometimes the parser may completely fail to produce any meaningful results when judged by human readers.

The present invention further provides methods for determining the term prominence or importance in a document when the results of the grammatical analysis by the parser are not available or not accurate for certain reasons, and also more methods for determining the term prominence or importance in a document when the results of the grammatical analysis are available or accurate enough.

A typical deterministic syntactic parser relies on the tagging of the parts of speech of each word in a sentence. As is in the traditional grammatical study, in the present invention, the term "parts of speech" refers to the classes or categories of word or phrases as they are used in a sentence. In traditional grammar, each word in a sentence can be labeled with a class name such as a "noun", "pronoun", "verb", "adjective" "adverb", "preposition", "article" "conjunction" and other classes. Also in the traditional grammar, the grammatical role of the "subject" of a sentence always has the parts of speech of a noun or a noun phrase. The predicate of a sentence typically consists of a verb, either with or without another noun as its object, such as in "The Sun rises" where the verb "rises" is an intransitive verb that does not take an object, and in "John wrote books" in which the transitive verb 'wrote" has an object of "books". The predicate can also consist of a link verb such as "is", "am", "are", etc., plus an adjective or a noun or a noun phrase, that are sometimes referred to as the "predicative". For example, in the sentence "John is a smart boy", the word "John" is the subject, and "is a smart boy" is the predicate, with "is" being the linking verb, and "a smart boy" being a predicative.

The parts of speech of a word can usually be obtained from a dictionary. Certain words in English can have different parts of speech. For example, the word "walk" can be a verb such as in "He wants to walk for a mile", or can be a noun such as in "He wants to take a walk". In such cases, parts of speech of a word can further be determined based on the context, such as the above sentences.

Generally speaking, identifying the parts of speech of a word either by dictionary lookup or by context analysis is easier than identifying the grammatical role of a word by a syntactic parser.

In some embodiments, the present invention determines the term importance score based on the parts of speech of a term. The present invention first identifies the parts of speech of a term, and optionally assigns a weighting co-efficient based on the parts of speech of the term.

Figure 19:
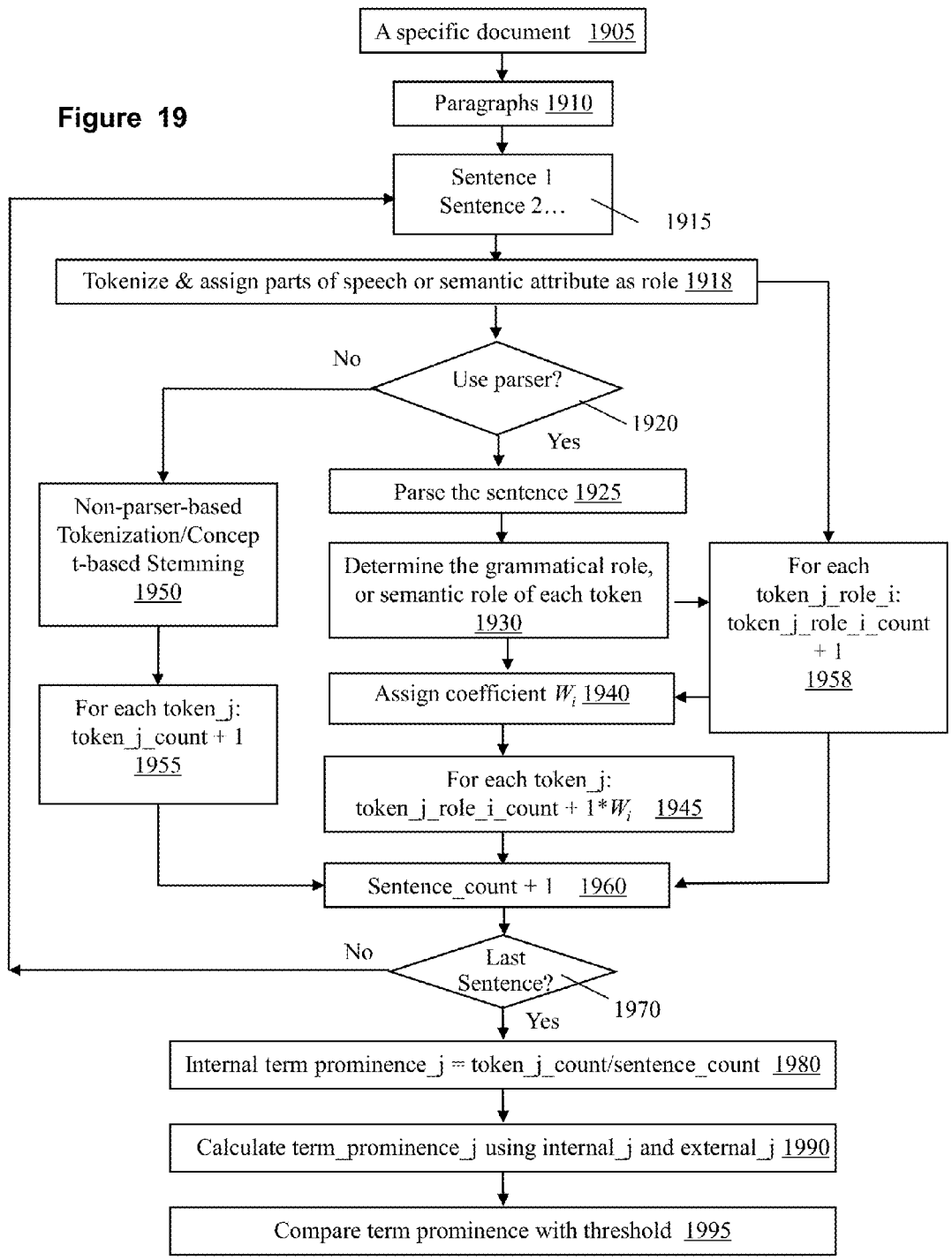
FIG. 19 is a flowchart illustrating the steps in calculating an Internal Term Prominence score with grammatical roles, parts of speech, or semantic attributes.
Figure 20:
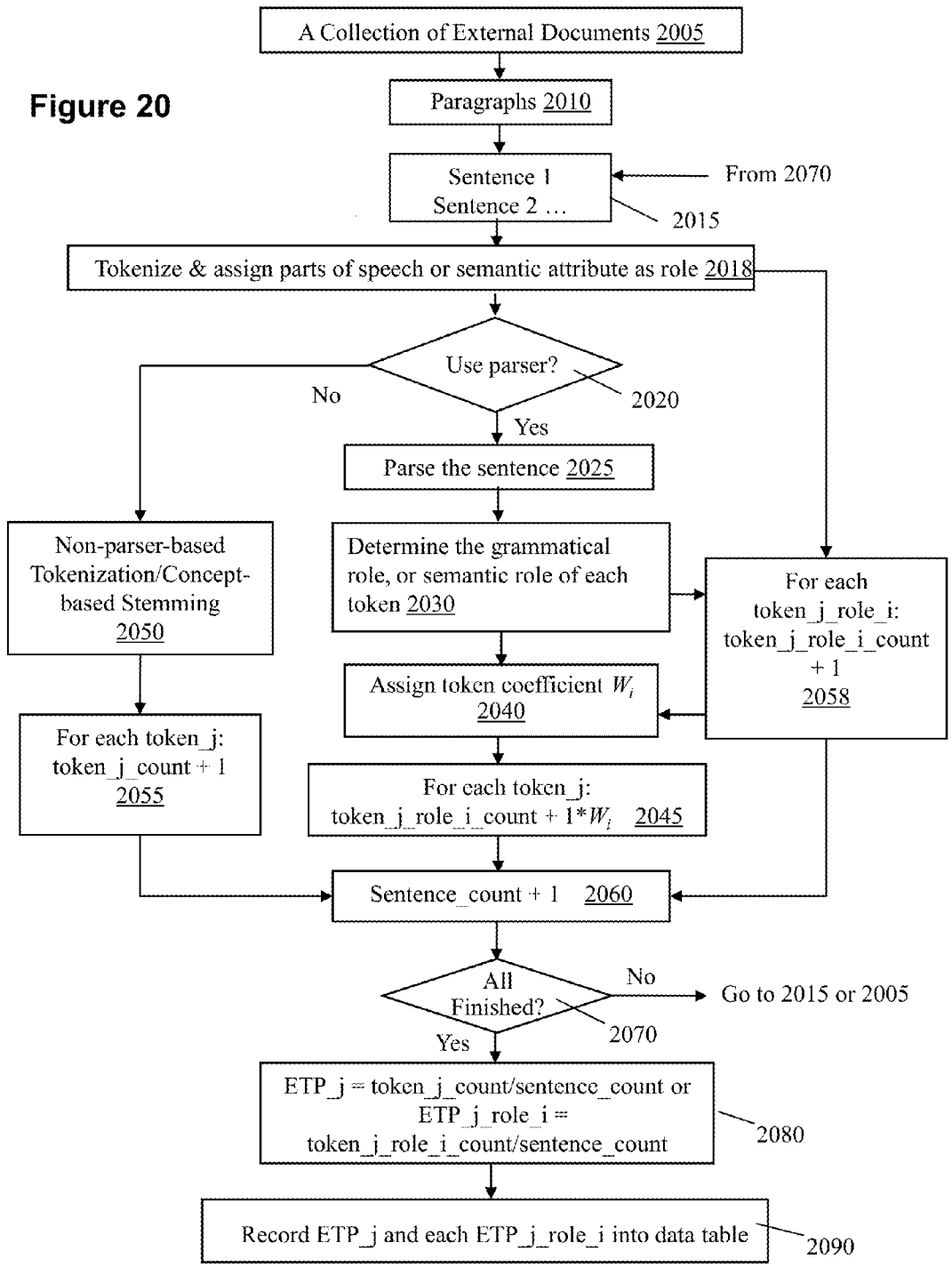
FIG. 20 is a flowchart illustrating the steps in calculating an External Term Prominence score with grammatical roles, parts of speech, or semantic attributes.

FIGS. 19 and 20 illustrate the exemplar steps of determining a term importance score using parts of speech. The figures also illustrate the steps using grammatical and semantic information as alternative methods for determining the term importance score, either alone, or in combination. As is described in the parent application of the present disclosure, sentences or paragraphs in a document are first identified (steps 1905, 1910, and 1915). Then sentences are tokenized into a plurality of tokens, and parts of speech are assigned to the tokens (1918).

In some embodiments, if only parts of speech are used, the term importance score can be determined by a cumulative token count of a term for a specific part of speech, such as the number of times a term occurs as a noun, or as a verb, etc., treating each parts of speech as a role (step 1958).

In some other embodiments, the term importance score can be determined by a cumulative token count of the term for more than one specific parts of speech, such as the number of times a term occurs as a noun, plus the number of times the term occurs as a verb, etc.

In some other embodiments, the token count based on the parts of speech can be multiplied by a weighting co-efficient, and the value of it can be dependent on the specific parts of speech (step 1940). For example, if a term is a noun or a noun phrase (such as the term "camera" or "digital camera"), it can be assigned a weighting co-efficient of 0.9, and if a term is a verb or verb phrase, it can be assigned a weighting co-efficient of 0.8. Similarly, if a term is an adjective, it can be assigned a weighting co-efficient of 0.7, and if a term is a adverb, it can be assigned a weighting co-efficient of 0.6, and if a term is a preposition, it can be assigned a weighting co-efficient of 0.5, and if a term is an article such as "a", "the", or a conjunction such as "and", "or", "either", "neither" etc., it can be respectively assigned a weighting co-efficient such as 0.4, 0.3, 0.2, etc.

The specific values of weighting co-efficient can be determined by the user depending on the specific needs. For example, for a document with a general content type, and for the purpose of discovering potential topics of a document, usually, terms that occur as nouns can be assigned a larger value than a verb or other parts of speech. This is also based on the fact that topic terms are most likely to be nouns than verbs. However, in some other document content type, weighting co-efficient for verbs or adjectives can have a larger value than other parts of speech for the purpose of extracting information from a document that has a focus on action, or opinion, etc.

Generally speaking, using a weighting co-efficient together with the parts of speech or role-based token count can help more effectively achieve the expected results in determining the term importance score of a term. In the following description, for ease of illustration, it is assumed that a weighting co-efficient is used whenever applicable.

In some embodiments, a term may have multiple potential parts of speech from a dictionary, and it cannot be easily determined from the context which part of speech is the correct one for the term in a specific context. For example, the phrase of "visiting friends", the word "visiting" may either be a verb, meaning someone is visiting his friends, or an adjective, meaning some friends are visiting him. In such embodiments, if a weighting co-efficient is used, the weighting co-efficient for such a term can be determined by first determining the weighting co-efficient according to each possible parts of speech associated with that term, and then calculate an average of the weighting co-efficient so determined for that term, and use this average as the final weighting co-efficient for that term.

With weighting co-efficient determined for each term based on the parts of speech, a weighted token count can be calculated by multiplying the co-efficient with each token count for that parts of speech (step 1945), and incremented to produce a cumulative score.

In some embodiments, when a document contains more than one sentence or paragraph, or a document collection contains more than one document as a text unit, the term importance score based on token count associated with the parts of speech, with or without weighting co-efficient, can further be determined by dividing the cumulative score of the term by the total number of text units in the document or document collection, as illustrated in steps 1960 to 1980.

In addition to the methods for determining the importance score based on the parts of speech of the terms in a document as described above, the present invention further provides methods for determining the term importance score based on the grammatical role or the semantic role or attributes of the terms in a document when such grammatical or semantic information is available.

The methods described above for parts of speech in steps 1905 to 1980 can equally be applied to the grammatical or semantic roles or attributes of a term in determining the importance score of the term, with a parser (1920) for determining the grammatical role or also semantic role when needed.

In some embodiments, as illustrated in FIG. 19, when grammatical roles can be identified for a term, a token count of the term for a specific grammatical role such as the subject of a sentence, or an object, or a modifier or a head of a multi-word phrase, or a predicative, can be calculated (1958), either alone or in combination of more than one grammatical roles that the term may occur.

In some embodiments, in addition to the role-based token count, a weighting co-efficient for each of the grammatical role can be multiplied together with the role-based token count (1940). For example, a term that occurs as a subject of a sentence can be assigned a weighting co-efficient of 0.9 as a relatively larger value for the purpose of discovering potential topics of a document. Likewise, a term that occurs as a predicate phrase can be assigned a weighting co-efficient of 0.8; a term that occurs as a head of a subject phrase can be assigned a weighting co-efficient of 0.7, a term that occurs as a modifier of a subject phrase can be assigned a weighting co-efficient of 0.6; a term that occurs as head of a phrase in the predicate can be assigned a weighting co-efficient of 0.5, and a term that occurs as a modifier in a phrase in the predicate can be assigned a weighting co-efficient of 0.4, etc. depending on the user needs.

Furthermore, the method for determining the term importance score based on the above-described examples with parts of speech and grammatical roles can also be applied to semantic roles or attributes when available, with or without using the weighting co-efficient, also as illustrated in steps 1905 to 1980. For example, in one embodiment, when weighting co-efficient is used, a term that is the "actor" of an action (such as the word "John" in "John broke the window") may be assigned a weighting coefficient of 0.9, while a term that is the "recipient" of an action (such as the word "window" in "John broke the window") can be assigned a weighting coefficient of 0.8; a term that is an "instrument" (such as the word "stone" in "John broke the window with a stone") can be assigned a weighting coefficient of 0.6; and a term that indicates a state or an attribute (such as the word "running" in "John is running") can be assigned a weighting coefficient of 0.4, etc.

In another embodiment, different weighting coefficient values can be assigned to the terms according to their semantic attributes or attribute values. For example, a term that is the name of a product or service such as "computer" or "consulting" may be assigned a weighting coefficient of 0.9, while a term that indicates an interest such as "like", "interested in", etc., can be assigned a weighting coefficient of 0.8; a term that indicates a positive opinion such as "good", or "fantastic", etc., can be assigned a weighting coefficient of 0.6; and a term that indicates a negative opinion can be assigned a weighting coefficient of 0.5, etc.

The semantic role of a term in a document can be obtained from semantic analysis using methods of user's choice. The semantic attributes or attribute type or value of a term can be obtained from a dictionary lookup, sometimes also with context analysis. A token count of the term for a specific semantic role or attribute can first be obtained (1958), and then the weighting co-efficient can be optionally applied to each token count (1940), as is with the parts of speech and grammatical role token count described above.

As is illustrated in the referenced disclosure, the text unit for analyzing the parts of speech, or the grammatical or semantic roles or attributes of the terms and for counting the occurrences of tokens can be a sentence or a paragraph of a document containing one or more sentences or paragraph. In the present invention, such text units for analysis can also include the entire document as a sub-segment unit of a larger unit of a document collection containing a plurality of documents.

In the same way as with parts of speech, in some embodiments, when a document contains more than one sentence or paragraph, or a document collection contains more than one document as a text unit, the term importance score based on token count associated with the grammatical or semantic role or attribute, with or without weighting co-efficient, can further be determined by dividing the cumulative score of the term by the total number of text units in the document or document collection, as illustrated in Step 1980 of FIG. 19.

With either the grammatical roles, parts of speech, or the semantic role or semantic attribute type or value available, and with their respective token count, and optionally weighting co-efficient determined for each term based on such information, and optionally with the above division by the total number of text units, a term score herein referred to as an Internal Term Prominence score (ITP) can be calculated using each of the information sources of parts of speech, grammatical role, or semantic role/attributes, or a combination of two or more of such factors.

Furthermore, in some embodiments, a document-specific term prominence (DSTP) score can be calculated using Equations (1) or (2) as described in the parent patent application cited above, with an External Term Prominence score (ETP) that is also based on the grammatical role, parts of speech, or semantic role or attribute type. FIG. 20 is an illustration of the steps for determining the External Term Prominence score (ETP) in basically the same way as in FIG. 19 for ITP, with the exception that the source text contents in FIG. 20 are from a collection of an external documents, preferably not including the documents used for calculating the ITP, and can be obtained from random sources. The principle behind using ETP has been described in the parent application of the present disclosure, and the steps in FIG. 20 are in a similar manner as in the parent application cited above in the present disclosure.

As is illustrated in the referenced disclosure and the present disclosure using ITP and EPT as a method of determining the term prominence score, in some embodiments, when none of the information about the parts of speech, or about the grammatical role, or about the semantic role or semantic attribute type/value is available or is used, the weighting co-efficient can be considered as being a constant such as the value of 1, which is equivalent to the weighting co-efficient being omitted (1950, 1955 for ITP, and 2050, 2055 for ETP), and the document-specific term prominence (DSTP) score can still be determined by using the frequency of the term in the document as its Internal Term Prominence score (ITP) and the frequency of the same term in external documents or random documents as its External Term Prominence score (ETP), and the document-specific term prominence (DSTP) score can still be calculated by using either Equation (1) or (2). Compared with conventional method of using term frequency alone, also using ETP with Equations (1) or (2) is both theoretically more founded as described in the Object Properties Association Model disclosed in the parent patent application of the present disclosure, and experimentally proven by the present inventor to be effective in achieving higher accuracy.

Similar to the referenced disclosures, once the term prominence or importance score is determined using one or more of the presently disclosed methods, terms having a prominence score above a predetermined threshold can be output to a computer system as the topic terms of the document or document collection, and can also be displayed in a user interface as a summary of the content of the document or document collection as illustrated in FIGS. 11 to 15, and the term prominence scores obtained from the one or more of the presently disclosed methods can also be used as the relevance score of the documents in serving a search query as illustrated in FIGS. 8, 9, and 10 in the parent application cited above. In addition to these, in the present disclosure, the topic terms thus identified can also be used for categorizing or clustering document contents, as will be described later.

Displaying one or more of such topic terms in a user interface in association with a document as a summary of the document content can be a very useful feature for enhancing user experience and productivity. This is especially useful when the text content is long, or when there are multiple text contents displayed in a list or group format. FIG. 21 is an example of topic terms used as summary information for a list of files, in addition to the FIGS. 11 to 15 in the above referenced disclosure.

In some embodiments, while one or more topic terms can be displayed alongside each file (2110), a user interface object often known as an "infotip window" can also be used to show a list of such topic terms as a summary (2120). Such a window can be activated by moving a pointing device to the file object, or by touching the object icon on a touchscreen.

Figure 22:
FIG. 22 is an illustration of a word cloud diagram.

In some embodiments, the topic terms can also be displayed in a non-linear format or a graphical format, such as the format known as a "word cloud" in some existing web pages currently seen on the Internet. A display format like this can have certain advantage over a list format, such as when the list is too long, and users may need to scroll to see more terms. In the present disclosure, in addition to displaying the topic terms alongside the text content object such as document or files on a computer as described above and shown in FIG. 21, the topic terms can also be displayed in a non-linear graphic format like the word-cloud format, in which, the font, size, color, shape, position, orientation of or distance between terms can be determined by various factors. In the present disclosure, the font, size, color, shape, potions, or orientation of a term or distances between a terms being displayed can be determined by the value of the importance score of the term obtained using the methods presently disclosed as described above. For example, a term with a large score value can be displayed in a large font size, or in a central or top position of the graph, and displayed horizontally, while a term of a smaller score value can be displayed in a relatively less important position or in a smaller font size, or even be vertically oriented to make room for other terms. FIG. 22 is an example of the graphic display of the terms in which the font, size, orientation, position, etc, can be determined based on the importance score values obtained using the presently disclosed methods.

In some embodiments, the topic terms can also be highlighted in the document. This provides an additional convenient way for users to grasp the major topics of the document in a glance when the user is reading the document. A user interface object can be provided to receive user indication whether to highlight the topic terms or not, and the system can act accordingly.

Search Relevance: Ranking Search Results Based on Term Importance Score

FIG. 10 from the parent patent application of the present disclosure illustrates a method of using topic terms and their corresponding term importance scores for more accurately ranking the search results. In the present disclosure, the same steps of using topic term scores for ranking search results can be further extended to incorporating the new methods for obtaining and determining the term importance scores as described above in the present invention.

Categorizing Text Contents Based on the Term Importance Score or Based on the Selected Topic Terms In U.S. patent application Ser. No. 12/782,545 entitled "System and methods for automated document topic discovery, browsable search and document categorization" file on May 18, 2010 by the present inventor, and U.S. Provisional Patent Application 61/568,657 entitled "System, Methods, and User Interface for Organizing Document Contents into a Hierarchical Structure and Selective Highlighting of Terms" file by the present inventor on Dec. 9, 2011, system and methods are disclosed for grouping document contents into categories based on the topic terms using the methods described in the referenced disclosure. In the present disclosure, the methods for categorizing document contents are further extended to include the methods for determining the term importance score as described above. Furthermore, the definition of document content is also extended to be either a single document, a sub-segment of a document such as a phrase, a sentence, a paragraph, or a document collection comprising one or more documents.

As mentioned before, in the following description, for ease of illustration, the term "prominence score" is interchangeably used with the term "importance score".

For illustration purposes, the examples used in the following description are based on sub-segments of one or more documents, such as one or more sentences or paragraphs from one or more documents. The methods can be equally applied to a whole document or a collection of documents, or multiple collections of documents.

The topic terms obtained by using the methods in the present invention as described above can be used for categorizing the contents of a document by grouping various parts of the contents that share certain topic terms as categories or clusters, and can be recursively applied to create sub-categories of the contents in the same way, and displayed to the users.

A sub-segment of a document containing text content can be one or more words, one or more sentences, or one or more paragraphs. A word can be identified by a word boundary such as a space in the English language and the like; a sentence can be identified by punctuation marks or certain known words, a paragraphs can be identified by line breaks; and in some cases a phrase can be identified by certain known words that occurs before and/or after that phrase, or by using what is known as a syntactic parser to identify the components and their structural relationships in a sentence or paragraph or a phrase.

Figure 23:
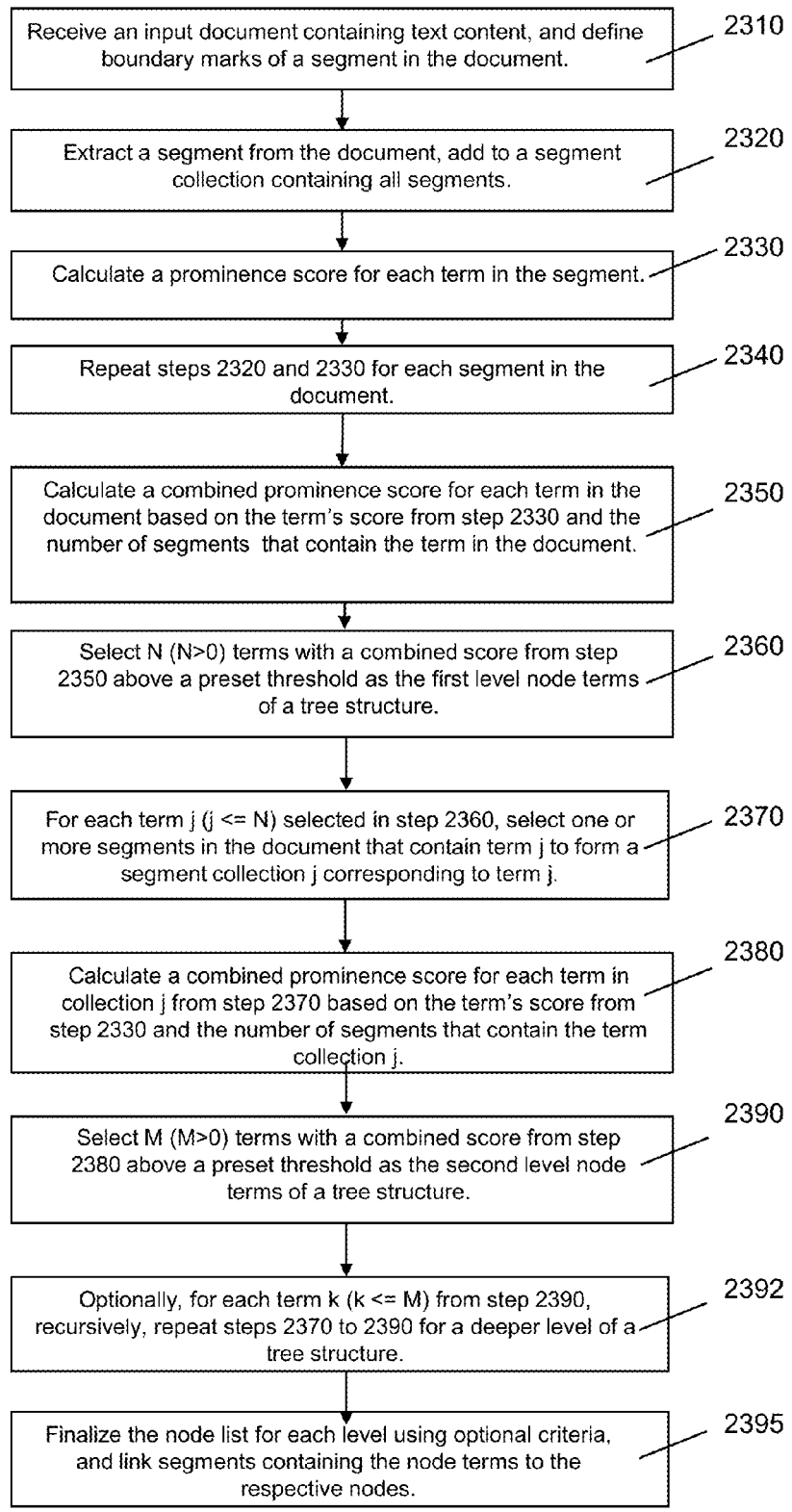
FIG. 23 illustrates a flowchart for determining categories in a category tree structure in accordance with the present invention.

FIG. 23 is an exemplar flow chart for the steps in selecting terms from segments of a document as node names on different levels of a hierarchical tree structure.

In FIG. 23, for an input document with text content (step 2310), the sub-segment boundary marks are first defined. For example, if the intended sub-segment is a sentence, certain punctuation marks such as a period, a question mark, etc., can be used as sentence boundary marks. Then, a sub-segment is first extracted from the input document (Step 2320). For each segment in the document, a linguistic or statistical analysis can be performed to calculate the importance score of each term based on a number of factors (step 2330), such as the steps described above with FIGS. 19 and 20. Once the term importance value is determined for each term in the first segment, the process is repeated for other terms in other segments in the document (step 2340).

Generally speaking, text content categorization is applicable only when there are multiple pieces of text contents, such as multiple sentences or paragraphs, or multiple documents in a document collection, or multiple document collections in a document repository. The term importance value determination methods as described above in the present and the reference disclosures can be applied to both single text content such as a sentence, a paragraph, or a document, or a document collection, and to multiple text contents as a whole, such as all sentences or paragraphs in a document or in multiple documents. Depending on whether the unit or object of operation is a sentence, a paragraph, a document or a document collection, the term importance score values obtained using the above described methods are the score values of the respective text unit for operation; and the importance terms or topic terms selected based on the term importance score values are also the topic terms of the respective operation units, whether it is a sentence, a paragraph, a document, or a document collection, etc.

In some embodiments, when multiple units of text contents are processed, such as for the present purpose of categorizing text contents, the term importance score values can first be determined for each individual text unit, and then be added to or combined to produce the term importance scores for the larger unit contain these individual text units. For example, term importance scores can be determined for each term in each sentence as individual text unit in a document containing multiple sentences, and then the scores of a term from different sentences in the document can be added up or combined in other ways to product the term importance score for the same term as its importance score for the entire document, and the selected topic terms can be used as the topic terms for the entire document, and the candidates for the first-level nodes of a category structure.

In some embodiments, the combined score of a term (j) in the document is obtained by the following method.

Suppose N (N>0) is the total number of segments (e.g., sentences) in a document, and term_j_score_in_segment_k is the term score obtained from segment k using the above described methods, and the term occurs in a total of M segments, then the combined_score_for_term_j for the entire document (not for an individual sentence) can be determined by the following formula:

$$\text{combined\_score\_for\_term\_}j = \text{Sum}(\text{term\_}j\_\text{score\_in\_segment\_}k)/N \quad \text{(Eqn. 3)}$$

where k=1 to M. Whether the score of a term is determined by first calculating the score for each occurrence of the term in the multiple contents, and then using Equation 3, or by directly calculating the score using the methods described in FIGS. 19 and 20 by treating the multiple-segment content as a whole, a pre-determined value can be used as a threshold value to select terms that have a score above this threshold value as the most important terms of the document, or the topic terms of the document. In some embodiments, a predetermined minimum value of token count for a specific parts of speech, grammatical role, or semantic attribute can also be used as a threshold for selecting terms as the most important terms in the content. For the purpose of categorizing text contents, the most important terms with the score above that threshold can be used as the first-level node terms of a category tree (step 2360). The result is a list of such terms at this point.

In some embodiments, certain criteria can be applied to add or remove terms from the first-level node term list obtained above. One criterion is that a term must occur in a minimum number of segments in order to be qualified for a first-level node term. Another criterion is that the term must occur in a minimum number of segments in which the term's score in that segment is above a pre-defined threshold value, such that, the segment has enough relevance to the term.

Once the first-level nodes are determined, a similar process can start to identify terms for second-level nodes in the tree structure under each first-level node. For each term j as a first-level node, a collection of segments from the same document is assembled, comprising the segments in which term j occurs. Optionally, a third threshold can be set to include only those segments in which the importance score of term j in that segment is above the threshold (step 2370).

Then, a collection-based score is calculated for each term in the segment collection for the jth term, using the same method as illustrated from steps 2350 to 2360 and Equation 3, or the methods in FIGS. 19 and 20. To avoid confusion, it should be emphasized that in the present case this collection j is a subset of the segments in the document that contain term j (step 2380). A fourth threshold value can be set to select only the terms in sub-segment collection j that have term prominence scores above the threshold as the second-level nodes in the tree structure under the first-level node j (step 2390).

As with the first-level nodes, in some embodiments, other criteria can be used to include or exclude certain terms from the second-level node list even though the prominence score of the term is above the threshold. For example, in some embodiments, the terms that appear on the second-level node candidate list may also appear on the first-level candidate node list. And in such cases, the term can be excluded from the second-level node list in favor of the first-level category node. This is in addition to the criteria used for the first-level nodes as described above.

The exemplar steps illustrated up to step 2390 can be recursively applied to the second-level node candidate terms to form the list of a third level node terms, or deeper levels if needed (step 2392).

Finally, the sub-segments that contain the term as a category node in a specific level can be linked to the category nodes on any level of the tree structure for easy retrieval.

In some embodiments, the order of the segments linked to the category node term is ordered or ranked by the value of the importance scores of the term in a specific segment. And a fifth threshold can be used to link only those segments in which the term has an importance score above the threshold (step 2395).

Figure 24:
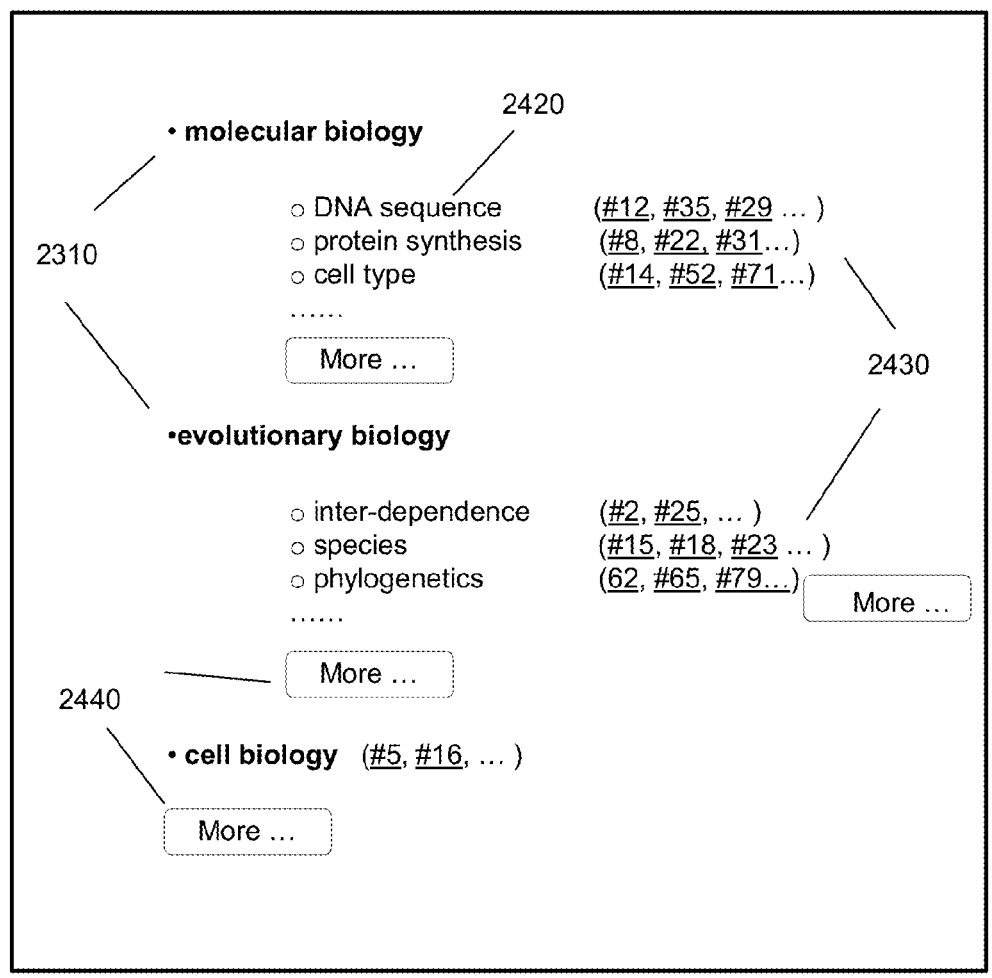
FIG. 24 is a diagram of a multi-level category tree for a science article in accordance with the present invention.

FIG. 24 shows an exemplar two-level category tree structure representing the hierarchical relations among terms in a document based on the segments of the document, using steps illustrated in FIG. 23.

In FIG. 24, the exemplar input document is an educational article about biology. The content is processed using the steps illustrated in FIG. 23 as described above, and the results are displayed on a computer screen or printed paper. In FIG. 24, 2410 is an exemplar list of the first-level nodes. 2420 is an exemplar list of second-level nodes under each first-level node in the tree structure. 2430 are links to the original segments in the document that contain the term that is the node name for either a first-level or a second-level node. 2440 are user interface objects that can be used to display more nodes of a level in the tree or links to related segments in the document.

Not shown in FIG. 24 but are provided by the present disclosure are other user interface control objects that can be used by the user to decide how many nodes for each level are to be created when processing the document using steps illustrated in FIG. 23 as described above, as well as how many levels of the tree structure are to be created, and how many segments are to be linked to each node. This can be accomplished by changing the threshold value to a larger or smaller value for the respective thresholds.

In some embodiments, relevant segments in the document are linked with only one level of nodes in the tree structure. In some other embodiments, segments are linked with multiple levels of nodes in the tree structure.

In some embodiments, the contents of more than one documents can be first merged into a single document and then the segments of the merged contents are processed using the methods described above, such that, the final result represents the contents of multiple documents in a single tree structure. This is especially useful when the user has multiple documents of the similar nature; or multiple documents of short length such that the contents of similar nature from multiple documents can be categorized into one single category structure. This can provide the user with a convenient single access point to dispersed contents.

In some embodiments, the methods for calculating the term prominence scores for the first-level nodes can be different from the methods for calculating the prominence score of the terms for the second-level nodes or the third-level nodes. For example, the calculation of the term prominence score and the selection of the first-level node terms can be more based on the grammatical role, such as whether a term is a subject of one or more sentences, or more based on the number of times a term occurs in the contents, or the number of segments a term occurs, such as in how many sentences or document a term occurs. On the other hand, the calculation of term prominence score and the selection of the second-level node terms can be more based on the semantic attributes such as whether a term indicates a positive or negative opinion, or more based on a specific grammatical role such as whether a term is part of a predicate of one or more sentences.

For example, in some embodiments of using the topic terms for content categorization and sub-categorization in the form of multi-level category tree, the values of the weighting co-efficient for different parts of speech, grammatical roles, and semantic roles can be different for different levels in the category tree to achieve certain special effects of information presentation. For example, terms that are intended for the first-level of category nodes can have a relatively larger value for the parts of speech of nouns or noun phrases, or for the grammatical role of subject, or for the semantic role of actor, etc.; and the terms intended to be the second-level node under the corresponding first-level node can have a relatively larger value for the parts of speech of adjective or verb, or for the grammatical role of predicate, or for the semantic role of action, etc., such that, a special category tree can be created using this method as an effective information presentation tool, in which the first level of nodes are names of subjects or actors, while the corresponding second-level nodes are terms representing what a subject is, or what it does.

Figure 25:
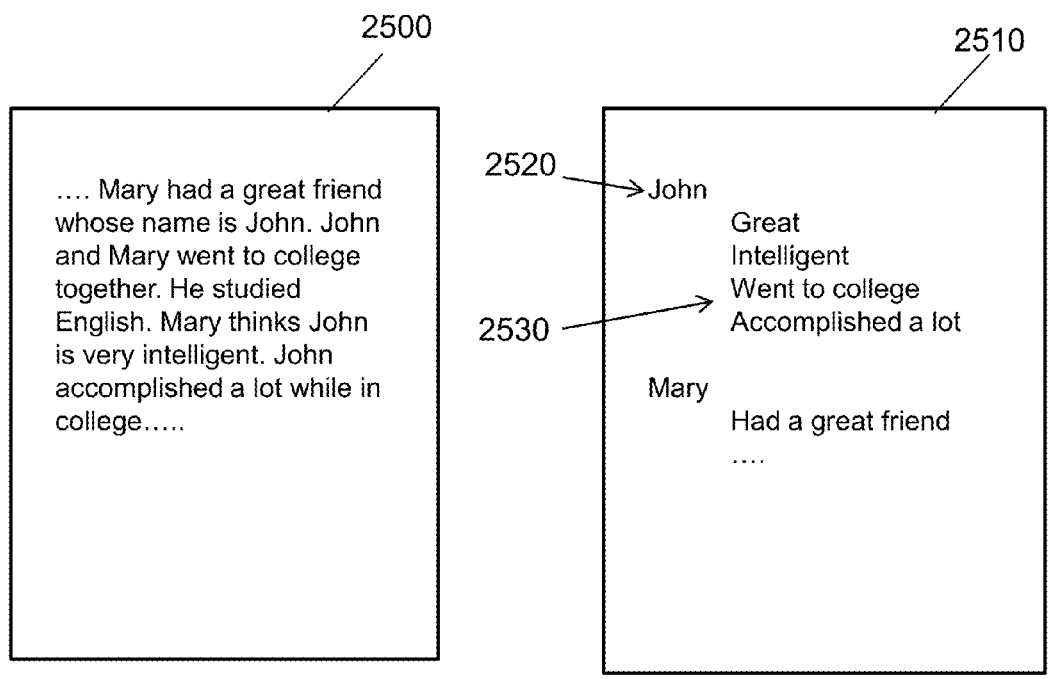
FIG. 25 is a diagram of a multi-level category tree view in accordance with the present invention.

FIG. 25 illustrates an example of categorizing document contents using terms with different values on different levels of the node tree, or using different selection criteria for different levels. Document 2500 contains text content. When larger weight is placed on grammatical role of subject when determining the first level node in the node tree 2510, subject nouns such as "John" will be selected for the first level node since the word "John" has a number of occurrences in the document as the subject of sentences (2520). Now, when determining the node names for the second-level nodes underneath this node, if larger weights are placed on grammatical roles such as predicate, or parts of speech of adjective or verb, then the second level nodes can include such terms as "intelligent", "went to college", "accomplished a lot", etc., (2530), and a special effect can be achieved in presenting the important information about "John" in a much easier manner than reading the entire text content for information about John.

In some other embodiments, the selection of the node terms can directly be based on the parts of speech, the grammatical roles, or the semantic role or attribute of a term, whether alone or in combination of two or more of such factors, without calculating a numerical value or a token count or an importance score first. For example, a term can be selected as a first-level node name if the term is associated with the grammatical role of "subject" at least once in the document, and a term in the non-subject part of the sentence identified as having a part of speech of an adjective or a grammatical role of "predicative" and with its subject matching the first-level node can be selected as a second-level node name under that first-level node to indicate a property or attribute of the subject. In other cases, a term can be selected as either a first-level or second-level node if it has a semantic attribute of indicating a product or service name, etc. This embodiment is especially effective for discovering and presenting topics and information about such topics in the text content of a relatively short or intermediate length.

In some embodiments, the terms used for the first-level nodes can be pre-defined, and the steps of analyzing grammatical roles, or parts of speech, or semantic attributes can be applied only to the terms for the second-level nodes. For example, in some cases, users prefer to pre-define the first-level nodes based on their domain knowledge or preference, such as pre-defining a list of terms representing the possible topics associated with certain types of text contents. For example, if the user knows that the text contents are about hotel reviews, he or she may pre-define a list of words such as "room", "bathroom", "bed", etc. and use these words as the first-level nodes. In such embodiments, terms for the second-level nodes can be selected if a term has a part of speech of an adjective, or a grammatical role of "predicative", and with its subject matching the first-level node can be selected as a second-level node name under that first-level node to indicate a property or attribute of the subject, as described above.

As has been noted earlier, the above illustration is based on categorizing the segments of a single document. For multiple documents, the present disclosure provides two alternative ways for categorizing or organizing their contents into a well-structured format such as a tree structure as described above.

In one embodiment, the contents of multiple documents can be merged together into a single document for this purpose, and the methods described above can readily be used without any modification. In other words, in such a case, the sub-segments of the merged document can still be sentences or paragraphs as described in the above illustration. This is a case for categorizing or clustering with a focus on cross-document topics and sub-topics.

In another embodiment, the multiple documents can be treated as a collection, and each individual document in the collection can be treated as a sub-segment of this collection, instead of using sentences or paragraphs as the sub-segments of the text content. This can be a typical case for document categorization or clustering for a large number of individual documents for the purpose of grouping similar documents into a limited number of categories.

In general, a term in the present disclosure can be a single word, a multiple word phrase, or a character string of any length in the document. A document in the present disclosure can be any type of electronic document containing recognizable text. It can be a regular document of general content, or a newspaper or journal/magazine article, a company report, a webpage, a blog article/comment, or online forum article/comment, an email, a text message, chat message, comments on a webpage, or an eBook, or any text entered on a social network site or mobile handheld communication or computing device, etc.

In some embodiments, the user interface objects representing the category nodes can be folders or directories or link names associated with the linked contents on a computer file system or an email system or a web-based or cloud-based system, or on a mobile or handheld computing or communication device.

When the presently disclosed methods are applied to any of the document types, many of what is known as either unstructured data, unorganized data, or dispersed data can be conceptually organized for easy access, retrieval, and digestion. For example, many users in the present information age can have hundreds or thousands of emails stored in their email box. Finding a particular email among a large amount of candidates can be a time-consuming task. However, with the presently disclosed methods, after all or part of the email messages are processed, a tree-like category structure can be created that can present the dispersed contents into a conceptually organized browsable structure, and with links to the relevant contents.

Furthermore, in the case of what is known as an eBook, whether there is a table of contents at the beginning of the book or an index at the end of the book, when the book is processed using the presently disclosed methods, a conceptually organized content category structure can provide a more efficient and meaningful alternative to the traditional table of contents and index which can be used for accessing, searching, and understanding the content of the book. In the same way, a collection of multiple eBooks can also be categorized using the same methods as described above.

Applications of the presently disclosed methods are not limited to the above examples. Virtually all types of text content can be processed using the presently disclosed methods to bring efficiency and productivity to its users. This includes various types of personal, business, or social data that are in free text format.

Selective Displaying or Highlighting of Terms Based on Term Importance Scores, Parts of Speech, Grammatical Roles, or Semantic Roles or Attributes The term importance score obtained by using the methods described in the present disclosure, and the information about the parts of speech, and the grammatical and semantic attributes of the terms that are used for the calculation of the term score can be further applied to various use cases to solve many real-world problems. The text content categorization as described above is one of the examples where such scores and attributes are used for building a category tree as an effective way for users to handle unstructured data and information overload. With such a category structure, users can have easier access to information that would otherwise be difficult to find, by browsing through the categories rather than conducting query-based searching.

In addition to making it much easier to find information from a large amount of unstructured or scattered data, the present invention can also directly present certain information to the user in a much more effective manner. Information represented by the terms in the original text contents or in the category structure can be more effectively presented to the user by allowing the user to selectively display or highlight certain terms in the content or in the category tree based on their importance score or specific meanings they represent when they are displayed in the user interface.

Figure 26:
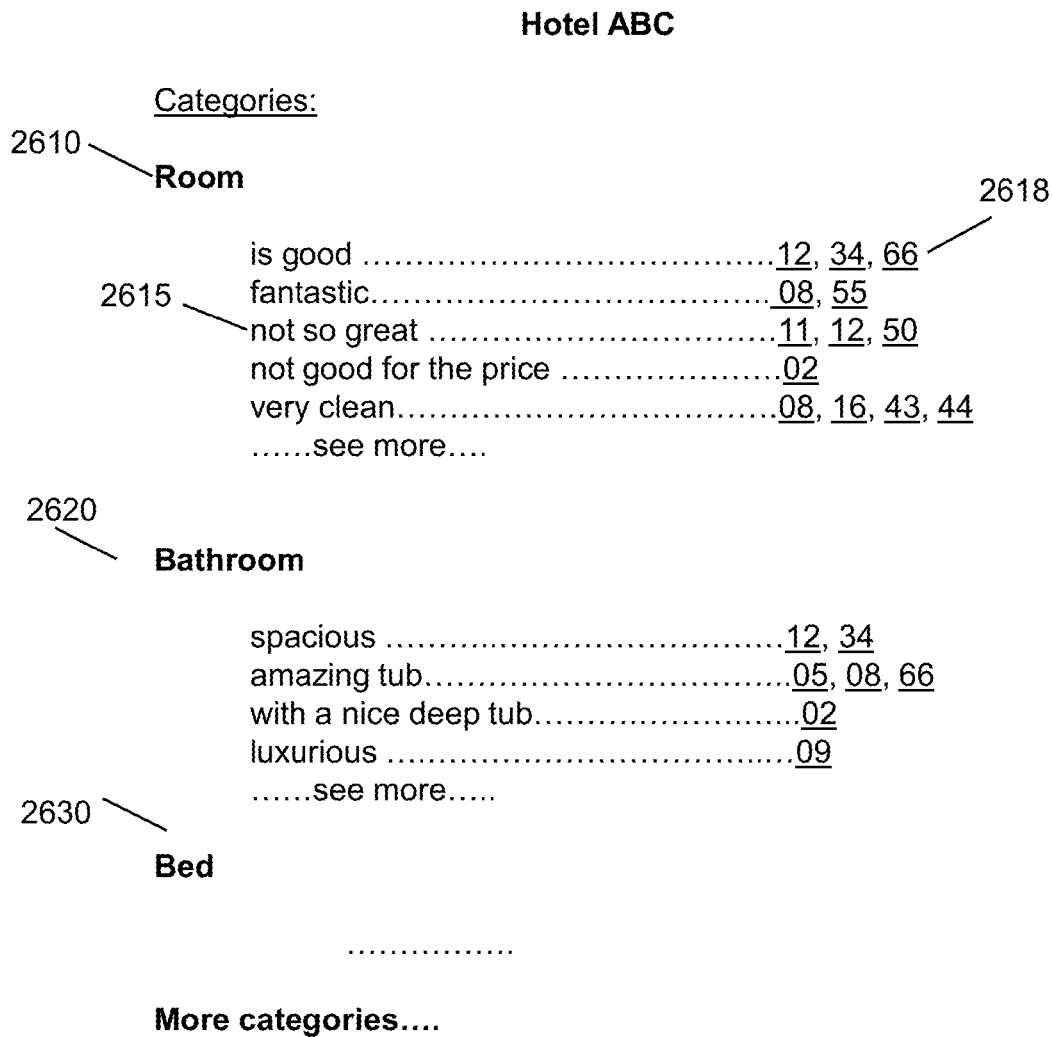
FIG. 26 is a diagram of a multi-level category tree for hotel reviews in accordance with the present invention.

In one embodiment, the document analyzed is a product or service review written by a reviewer. For certain types of products or services, such as hotels and restaurants, there can be hundreds or thousands of reviews for an individual product or service on certain websites. If a reader wants to find information relating to a specific aspect of the product/service, such as the room service of a hotel or a special dish served by a restaurant, the user may need to dig in the hundreds or thousands of the reviews or performing a keyword-based search for such aspects of the product/service, provided that the search function is available. However, using the presently disclosed methods, a category tree structure can first be produced to represent the topics and sub-topics of the contents of the hundreds or thousands of review articles as illustrated in FIG. 26. The reader can first look at the category tree's first-level nodes 2610, 2630, or 2630 to quickly find the specific topics of interest, and can in most cases immediately have an idea about what the reviewers have said about a topic by looking at the sub-topics or node names of the lower-level category branch (2615), or just click on a link 2618 that can display the detailed content relating to the topic represented by the node names at different levels. When applied to the product/service review documents, in addition to providing a categorized topic view, the present disclosure further provides a method and user interface for capturing and presenting the key information in the content to the readers of this type of document in a novel and more efficient way.

A product/service review usually contains opinionated comments by the reviewer, and a rating of the product or service is largely determined by such opinions from the reviewers. On the other hand, readers of such reviews are mainly interested in knowing whether a particular aspect of the product or service is good or not.

In such cases, the present disclosure first identifies whether a term used by a reviewer indicates a positive or negative or neutral opinion, and displays such terms in a way that can let the reader quickly identify what is said to be good or bad. In one embodiment, a special visual effect is applied to the opinionated terms to highlight the term against the visual background of the document. For example, to highlight the positive terms in a greenish color, and highlight the negative terms in a yellowish color. This way, the reader can immediately know the key terms that describe whether the product or service is considered to be good or bad by the reviewer. This visual highlighting can be applied to either the node names in the tree structure, or to the content retrieved by clicking on the links associated to the node names, or both the node names and the displayed content.

In some embodiments, when the node names are also terms that carry a positive or negative or neutral opinion, the present system can selectively display or hide a node based on the particular opinion value of the node name. For example, users can selectively show only the nodes in the category tree that represent positive comments, or negative comments, etc. This can also be a useful feature for organizing and digesting information, especially when the number of nodes in a category structure is large and representing different opinions.

Furthermore, the present disclosure provides a user interface with control objects to let the reader decide whether to highlight or show only the positive or negative comments, or comments of both types. This way, the reader can save much time in finding the information he or she is looking for, skipping the part that is of less interest.

Figure 27:
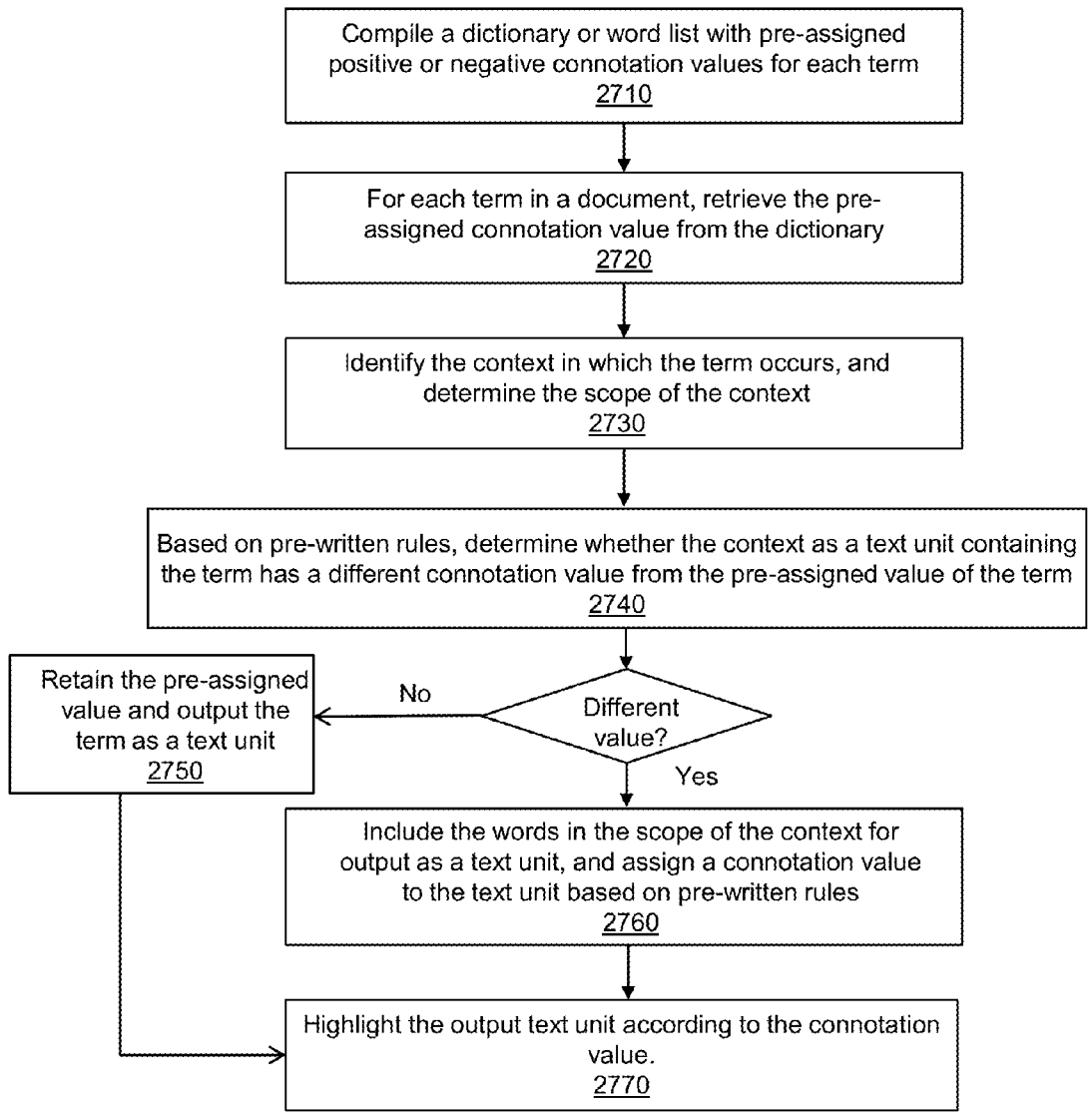
FIG. 27 is a flowchart of steps in determining positive and negative sentiment in accordance with the present invention.

FIG. 27 is an illustrative diagram for a method of identifying the terms that indicate different opinions.

To identify the terms that indicate an opinion, a dictionary or word list is first compiled to store the pre-assigned connotation or attribute type/value for each term to indicate whether the term carries a positive, negative, or neutral opinion (Step 2710). For example, in English, the word "good" can exemplarily be put in a positive word list, or be assigned a value of 1 to indicate that it inherently represents a positive opinion, and the word "bad" can exemplarily be put in a negative word list, or be assigned a value of −1 to indicate that it inherently represents a negative opinion, and the word "many" can exemplarily be put in a neutral word list, or be assigned a value of 0 to indicate that it inherently represents a neutral or no opinion. The list can be compiled manually by a human editor, or automatically by a computer program using some type of machine-learning methods, or both. The value can exemplarily be between +1 and −1, or +5 and −5 for finer distinction. Once the dictionary is available, for each term in the document, its pre-assigned connotation or attribute type/value is retrieved from the dictionary (Step 2720). If a term is not found in the dictionary, it is assigned a default value of zero.

The detailed method of compiling this list is not the focus of the present disclosure.

In the present disclosure, one focus is on identifying the context that may change the inherent connotation of a term, and determine the scope of the context to be highlighted to the reader. For example, when the word "good" is used alone, it usually indicates a positive opinion; and when it is used in a context of "very good", the entire phrase still represents a positive opinion. However, when it is used with another word such as "not", as in "not good", or "not very good", the contextualized phrase of "not good" or "not very good" represents a negative opinion. If only the word "good" is looked up from the dictionary without also identifying the context, it will still be treated as indicating a positive opinion, which would be incorrect.

The present disclosure uses linguistic rules to identify the context (Step 2730) and determine whether the context affects the pre-assigned value or not (Step 2740).). If the context does not change the pre-assigned connotation or attribute type/value, then the original pre-assigned value is retained and the term is output for display and highlighting (Step 2750). If the context as a text unit indicates a different opinion from the pre-assigned value of the term, then the scope of the context is identified as a larger text unit containing the original term (Step 2760), and words in the context scope are assembled into a string for output as a whole for display and highlighting, and to correctly and accurately indicate the opinion of the contextualized text unit to the reader.

For example, if the original text is "It is not good", the text unit of "not good" will be identified as indicating a negative opinion, and will be treated as the scope of this context, and will be output for highlighting as a unit; if the original text is "nothing there seems to be good", the entire sentence of "nothing there seems to be good" is treated as indicating a negative opinion, and also as the scope of this context, and will be output for highlighting as a unit; if the original text is "I don't think it's good", either the entire sentence is treated as indicating a negative opinion and as the scope of this context, and will be output for highlighting as a unit, or part of the sentence such as "don't think it's good" is treated as the scope of this context, and will be output for highlighting as a unit. This way, the output will not highlight the word "good" alone as indicating a positive opinion, but will correctly indicate that the contextualized text unit represents a negative opinion.

Negation is only one of the context types that represent an opinion that can be different from or opposite to the pre-assigned connotation of a term without the context. Other types of contexts can also have a similar effect. For example, when people usually think that "high quality" is good, and "low quality" is bad, the word "high" or "low" alone cannot always determine whether the resulting connotation is positive or negative. For example, people usually know that "high blood pressure" is not good, but "low blood pressure" is not a good thing, either; and what is good for blood pressure is "normal blood pressure". Thus, different rules must be used to handle different cases. While details of writing such pre-written rules are not a focus of the present disclosure, the methods disclosed in the present invention can use such rules to identify the resulting connotation or attribute type/value for different context types, and identify the corresponding scope of context for display and highlighting (Step 2770).

Figure 28:
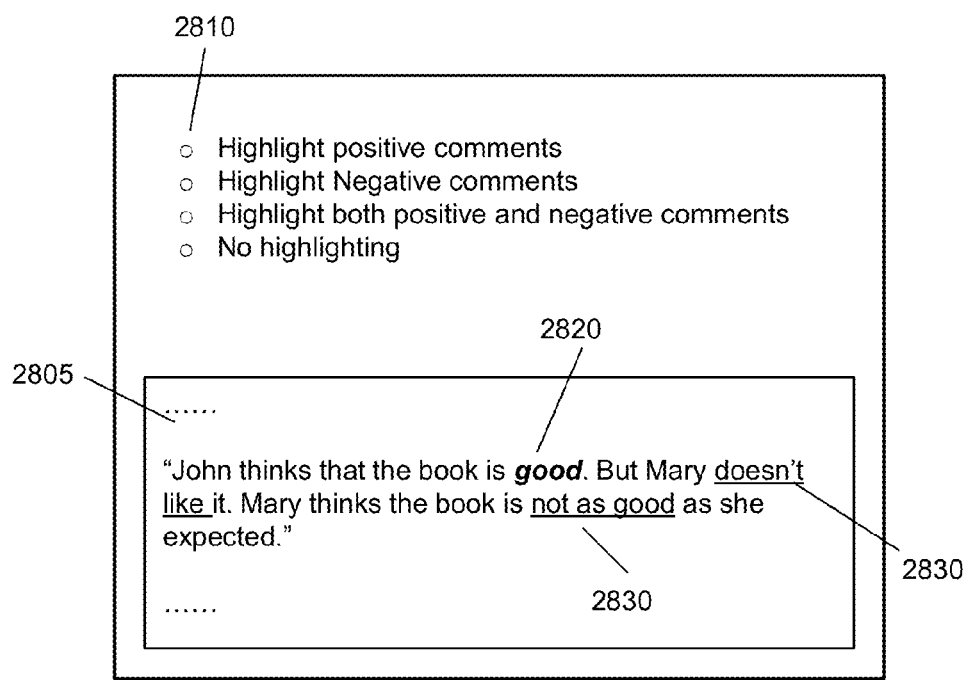
FIG. 28 is a user interface diagram for selectively highlighting positive and negative topic terms in accordance with the present invention.

FIG. 28 is an exemplar illustration of a user interface with user control objects of clickable buttons (2810) for selectively highlighting the terms based on the context. In the exemplar document content (2805), John gives a positive opinion on the book as being "good", and the term "good" is highlighted in bold and italic font style (2820). On the other hand, Mary has a different opinion on the same book. In this case, even though the word "like" has a pre-assigned positive connotation value, the context of the term "like" is identified, and is determined that the context of "doesn't like" as a text unit has a negative connotation, opposite to the pre-assigned positive value for the term "like". Using a pre-written linguistic rule, the scope of the context is identified to be "doesn't like" as a text unit, and the entire text unit of "doesn't like" is highlighted by an underlined font style (2830), different from the positive word of "good". Furthermore, in the third sentence of "Mary thinks the book is not as good as she expected", even though the word "good" has a pre-assigned positive connotation value, the present invention identifies the context of the word "good" to be a negation context, and the scope of the context is determined to be "not as good" and is treated as a single text unit or a single term. In the output, the text unit of "not as good" is highlighted also with an underlined font style to distinguish it from the positive instance of "good" in the same document (2830).

The user can click on either the button named "Highlight positive comments" or the button named "Highlight negative comments", or the button named "Highlight both positive and negative comments" or the button named "No highlighting" (2810), and the document will be displayed with positive or negative comments highlighted or not highlighted according to the user selection. In the case of a category tree structure with different levels of nodes, the node terms can be either displayed or hidden, or highlighted or not highlighted as described above, according to their semantic and grammatical context, or the scope of such context.

It should be noted that in modern-day user interface, certain information in the content can be easily highlighted either by default, or by pre-configuration as user preference, or by a process such as highlighting certain specified keywords, or highlighting keywords that match a search query in a search result page. However, users are not able to dynamically and selectively highlight part of the contents that contain specific information, especially such information that do not directly match a keyword in the content, such as a stretch of text that indicate a positive or negative opinion, or other type of grammatical or semantic attributes or properties of an object represented by a term. For example, certain web pages automatically highlight addresses or phone numbers or names of places contained in a page or email, but users do not have real-time control to select which information to highlight and which information not to highlight, and the statically highlightable information is limited to predefined items such as address or phone numbers, etc., based on string pattern matching, rather than the linguistically meaningful units such as positive or negative opinions and their contexts. One of the novelties of the present invention is to first identify the grammatical or semantic attributes of terms and their context scope in the document, and then providing user interface control objects for users to dynamically and selectively highlight terms and their contexts that carry specific information to serve their specific needs.

The above disclosed method of identifying and assigning connotation or attribute type/value of a term in a document or a node names in a category tree, and providing user interface objects for users to decide whether or how to display or highlight terms or text units of a specific connotation or attribute type or value is not limited to the specific document type of product/service review as exemplified above.

The method can be generally applied to other types of documents and other types of attributes as well.

In some embodiments, a term importance score based on specific grammatical or semantic attribute or other information can be first calculated, and then users can highlight terms that have their score above a threshold. These terms can suggest the main topics or specific information focus of the documents, such as the various examples described in the present disclosure.

In some other embodiments, the criteria for highlighting terms can be based on the meanings or attributes or properties of the terms that represent certain objects in the real world. For example, if a document is a medical research paper and contains terms that are names of different medicines, and some readers may want to quickly know which medicine is clinically tested or FDA approved, or have interaction with other drugs, etc. In such a case, as long as a dictionary or a database containing necessary information about whether a medicine has been clinically tested, FDA-approved or recalled is available, such information can be treated as a semantic attribute type or value, and can be assigned to the respective terms in the document or node names in a category tree structure. When the document is displayed to the reader, with the user interface objects such as clickable buttons or touchable icons as described in the present invention, readers of the document can decide whether or how to highlight terms of a specific type of the attribute, such that, readers can quickly find the information in a document that is of the most relevance to them by selectively highlighting the names of the type of medicine that the reader wants to know.

In some embodiments, terms in a document or in a category tree can be pre-labeled with grammatical or semantic attributes or roles. In some other embodiments, such roles or attribute types or values can be obtained real-time from accessible databases or knowledge bases, such as those that can be stored either locally or on a cloud-based computing and storage systems. In some embodiments, the system stores certain domain-specific datasets, each containing terms that are associated with certain domain-specific attributes, such as the medical domain. In some other embodiments, the system can store a wide range of dataset across multiple domains to serve general requests.

User interface objects can be provided for the user to specify a pre-defined criterion for highlighting or extracting terms that meet the criterion, without user typing in the criterion specification. For example, when reading medical documents, a user interface object can be provided to allow the user to select such actions as "highlight and extract drug names that have an interaction with other drugs", or "highlight and extract drug names that can reduce arthritis symptoms", etc. In the present invention, the user indication can be transformed into a search process, and a list of drug names meeting the criteria can be retrieved from a database accessible to the system that displays the current document, and the system then can perform a function similar to a inside-document-search function to find the terms in the current document that match the terms in the retrieved list, and if the user so requested, can highlight or cancel existing highlighting or extract such terms and display them in a user interface in a way that the user can copy/paste or record or use them elsewhere.

In some other embodiments, in addition to displaying pre-compiled selection criteria, the system can allow the user to enter a criterion using natural language, and interprets the intended criterion, and perform a similar operation.

Searching and Displaying Results with Context Information

In the present invention, methods to extract topic terms of a document have been disclosed. These topic terms can form different nodes in different levels of a tree structure for displaying the topics and their related information or context.

The above methods of displaying a topic with its context information can be used to create a new type of information search and display system and methods, including searching documents, webpages, emails, or any object with text content.

In a search system, a searchable term in a search index is associated with one or more documents that are considered to be relevant to the searchable term. A conventional search engine displays the associated links to the relevant documents in the search results. Often, a summary of the document content is displayed together with the links to the whole documents. The summary usually contains some texts surrounding the terms that match the query keyword. However, such brief excerption often does not provide enough information about the topics the user is searching for, and, users need to follow the links to each document to read the contents.

In contrast to the conventional search results, in the present invention, in addition to the conventional method of search and results display, a list of context terms that carry relevant information about the query can also be displayed using the method of the present invention. These context terms can be extracted from one or more of the relevant documents using the presently disclosed methods for topic extraction and categorization as described above.

Using the present methods for categorizing document contents, for each searchable term in the search index, a topic tree structure can be produced in which the searchable term in the index is the first-level node, representing a topic in the relevant documents, and terms carrying related information about the topic can be extracted from one or more relevant documents to form the second-level nodes of a tree structure. For example, if the query term matches the subject of one or more sentences in one or more relevant documents, the predicate or part of the predicate in these sentences can be extracted and presented as the second-level nodes under the query keyword. As is illustrated in the Object Properties Association Model of Language and Information above, the predicate of a sentence carries information about the subject of the sentence. This way, users can immediately know what has been said about the topic being searched for, without needing to follow the links to each individual document to find out if they contain the needed information.

Figure 29:
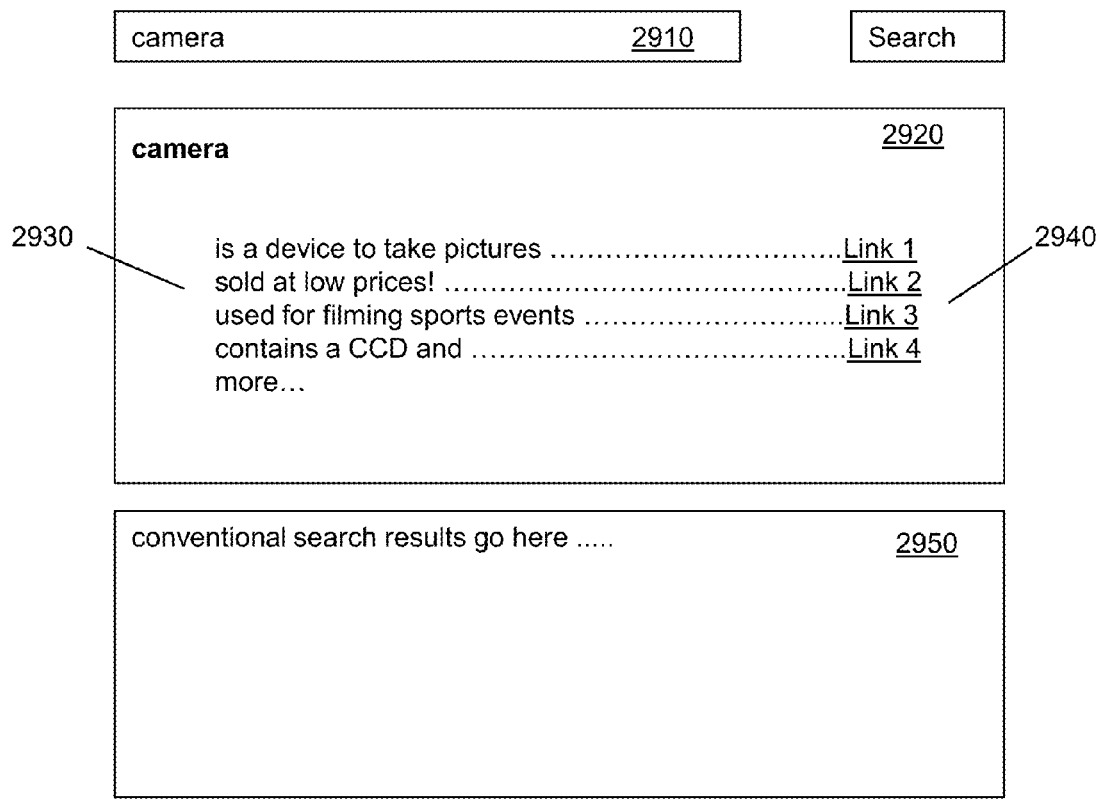
FIG. 29 is a user interface for displaying search results along with information-carrying context terms in accordance with the present invention.

One embodiment of the present invention is illustrated in FIG. 29. In a conventional search system, search results can be displayed when the user enters a portion of the query, when a user activates a use interface object, such as a button labeled "Search". In the present invention, when a user enters a query term into search box 2910, the system extracts and displays a list of context terms 2930 carrying relevant information about the query in the results area 2920 along with links 2940 to the documents or webpages that contain the context terms. Conventional search results can also be displayed in area 2950.

In general, the present invention gives the user more information about the query, without actually having to click and browse through the results themselves. The present invention is also a more direct way to obtain information from search, as it directly delivers information about a query that is extracted from the search results, rather than only displaying the links to the results, of which the user must go through to find the desired information.

The above are only examples of the methods and applications. The presently disclosed system and methods and user interface can also be applied to many other environments without deviating from the spirit of the principles and the methods described above.

What is claimed is:

1. A computer system, comprising:
   a processor operable to
   receive a text content comprising a plurality of terms, each term comprising one or more words or phrases;
   tokenize the text content into a plurality of terms, each term comprising one or more words or phrases;
   identifying a first semantic attribute or a first part of speech, wherein the first semantic attribute is selected from the group of semantic attributes consisting of at least an action, a thing, a person, an agent of an action, a recipient of an action or a thing, a state of an object, a mental state of a person, a physical state of a person, a positive or negative opinion, a name of a product, a name of a service, a name of an organization, wherein the first part of speech is selected from the group of parts of speech consisting of at least a noun or a pronoun, a transitive or intransitive verb or modal verb or link verb, an adjective, an adverb, a preposition, an article, a conjunction;
   identify a first term in the text content, wherein the first term is associated with the first semantic attribute or the first part of speech;
   identify a second term in the text content, wherein the second term is not associated with the first semantic attribute or the first part of speech;
   associate an importance measure to the first term, based at least on the first semantic attribute or the first part of speech, to mark the first term as bearing more importance than the second term in representing a topic or an information focus in the text content;
   extract the first term based on the importance measure; and
   output the first term;
   when the first term is output, the function of the first term includes being a tag or a label to represent a topic or a summary of the text content, or a category node;
   when the first term is output and displayed, the display format includes the font type, size, color, shape, position, or orientation of the first term based on the importance measure;
   when the text content containing the first term is made searchable using a query or is associated with a search index to produce a search result, the search result is ranked based at least on the importance measure.

2. The system of claim 1, wherein the processor is further operable to:
   associate a first weighting co-efficient to the first semantic attribute or the first part of speech, and determine the importance measure based on the first weighting co-efficient.

3. The system of claim 1, wherein the processor is further operable to:
count a first frequency of the first term in the text content, and determine the importance measure based on the first frequency.

4. The system of claim 1, wherein the processor is further operable to
output an element selected from the group of elements consisting of the importance measure and a first text unit that includes the first term.

5. The system of claim 4, wherein the processor is further operable to
create a link between two of the elements selected from the group of elements consisting of the first term, the first text unit, and at least a portion of the text content associated with the first term.

6. The system of claim 5, wherein the processor is further operable to
detect an action on the link; and
display, based on the action, at least one of the elements selected from the group of elements consisting of the first term, the first text unit, and at least a portion of the text content associated with the first term.

7. The system of claim 1, wherein the processor is further operable to
receive, via a user interface object, a user indication; and
highlight the first term in the text content according to the user indication.

8. The system of claim 1, wherein the processor is further operable to
receive a search query comprising a keyword;
match the keyword with the first term;
return the text content as a search result or part of a search result; and
rank the search result based at least on the importance measure.

9. The system of claim 1, wherein the text content is a sub-segment text unit in a collection of sub-segment text units, wherein the sub-segment text unit includes a sentence or a paragraph when the collection is a document comprising a plurality of sentences or paragraphs, or the sub-segment text unit includes an individual document when the collection is a document collection containing a plurality of documents.

10. A method implemented on a computer comprising a processor, the method comprising:
receiving a text content containing text;
tokenizing the text content into a plurality of terms each comprising an element selected from the group of elements consisting at least of a word, a phrase, a sentence, a paragraph;
identifying a first term in the text content;
identifying, in at least a portion of the text content, a second term, wherein the portion of the text content contains the first term or is grammatically or semantically associated with the first term;
identifying a first grammatical attribute associated with the second term, or identifying a first semantic attribute associated with the second term;
selecting the second term as a term related to the first term based at least on the first grammatical attribute or the first semantic attribute;
marking the first term for use as a first-level entity in a hierarchical format, and marking the second term for use as a second-level entity in the hierarchical format, wherein the second-level entity is marked as an element under or subordinate to the first-level entity; and
outputting the first term and the second term to be used for at least providing a relational or hierarchical representation of the informational elements in the text content;
when the first term is used to represent a first-level category node, and the second term is used to represent a second-level category node or the content of the first-level category, an embodiment format of at least one of the category nodes includes a text element, a folder or a directory, or a link name associated with the linked contents on a device selected from the group of devices consisting at least of a computer file system, an email system, a web-based or cloud-based system, a mobile or handheld computing or communication device;
when the first term and the second term are displayed, a display format comprises at least representing the first term as a topic or information focus in the text content, and the second term as a comment or attribute associated with the topic or the information focus; or representing the first term as a folder or directory in an electronic content management system, and the second term as a sub-folder or sub-directory in the electronic content management system;
when the text content or the first term is made searchable using a query or is associated with a search index to produce a search result, a display format of the search result comprises the first term with one or more of its corresponding second terms if the first term matches a keyword in the search query.

11. The method of claim 10, when the first grammatical attribute is identified, the grammatical relationship between the first term and the second term includes a relationship between a subject and a non-subject of a sentence, or a modifier and a head of a complex phrase.

12. The method of claim 10, when the first semantic attribute is identified, the semantic relationship between the first term and the second term includes a relationship between an object represented by the first term and a semantic attribute or attribute value represented by the second term and associated with the object, wherein the object includes at least a person, an organization, a product or service, a physical thing or a concept.

13. The method of claim 10, further comprising:
comparing the first term and the second term, and
selecting the second term if the second term is different from the first term.

14. The method of claim 10, wherein the first term is obtained from an input source.

15. The method of claim 10, when the first term is selected from the text content, the method further comprising:
identifying a second grammatical attribute or a second semantic attribute;
identifying a term associated with the second grammatical attribute or the second semantic attribute; and
selecting the term as the first term based at least on the second grammatical attribute or the second semantic attribute.

16. The method of claim 15, further comprising:
counting the occurrence of the first term in the text content; and
selecting the first term if the occurrence of the first term in the text content is above a threshold.

17. The method of claim 15, further comprising:
associating a first importance measure with the first term based on the second grammatical attribute or the second semantic attribute associated with the first term;

selecting the first term if the first importance measure is above a threshold.

18. The method of claim 10, wherein the text content includes user reviews of a product or a service, or comments on social or political or financial or other topics, wherein the first term represents a major topic in the text content, and the second term represents a minor topic or a description or comment about the major topic; wherein the first semantic attribute or the second semantic attribute includes at least a positive and a negative opinion, the method further comprising:
    providing a user interface object to selectively display, hide, or highlight the first term or the second term based on whether the first term or the second term indicates a positive or a negative opinion; or to selectively highlight one or more terms in the text content associated with the first term or the second term, according to whether the one or more terms indicate a positive or negative opinion.

19. The method of claim 10, when the first grammatical attribute is identified and used, the first grammatical attribute includes a subject, a predicate, a sub-phrase of a multi-word phrase, a modifier in a multi-word phrase, a head of a multi-word phrase, a direct or indirect object, a predicative, a complement; and the first grammatical attribute further includes parts of speech, wherein the parts of speech include at least a noun or a pronoun, a transitive or intransitive verb or modal verb or link verb, an adjective, an adverb, a preposition, an article, a conjunction.

20. The method of claim 10, when the first semantic attribute is identified and used, the first semantic attribute includes at least an action, a thing or a person, an agent of an action, a recipient of an action or a thing, a state of an object, a mental or physical state of a person, a positive or negative opinion, a name of product or service or an organization.

* * * * *